United States Patent
Knoppert et al.

(10) Patent No.: US 11,106,286 B2
(45) Date of Patent: Aug. 31, 2021

(54) SYSTEM AND METHOD FOR MOOD DETECTION VIA PIEZO HAPTIC KEYBOARD DYNAMICS

(71) Applicant: Dell Products, LP, Round Rock, TX (US)

(72) Inventors: Michiel Knoppert, Amsterdam (NL); Priyank Gajiwala, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/779,528

(22) Filed: Jan. 31, 2020

(65) Prior Publication Data

US 2021/0240283 A1 Aug. 5, 2021

(51) Int. Cl.
*G06F 3/023* (2006.01)
*G06F 1/16* (2006.01)
*G06F 3/041* (2006.01)

(52) U.S. Cl.
CPC ............ *G06F 3/023* (2013.01); *G06F 1/1664* (2013.01); *G06F 3/0414* (2013.01); *G06F 2203/011* (2013.01)

(58) Field of Classification Search
CPC ...... G06F 3/023; G06F 3/0414; G06F 1/1664; G06F 2203/011
See application file for complete search history.

(56) References Cited

U.S. PATENT DOCUMENTS 4,618,797 A 10/1986 Cline
4,857,887 A 8/1989 Iten
(Continued)

FOREIGN PATENT DOCUMENTS

JP 2014164610 A 9/2014
KR 100442116 B1 7/2004
(Continued)

OTHER PUBLICATIONS

Rekimoto, J., et al., "PreSensell: Bi-directional Touch and Pressure Sensing Interactions with Tactile Feedback," Apr. 2006, 6 pages.
Rekimoto, J. et al., "PreSense: Interaction Techniques for Finger Sensing Input Devices," UIST '03 Vancouver, BC, Canada, Nov. 2003, pp. 203-212, ACM 1-58113-636-6/03/0010.
(Continued)

*Primary Examiner* — Kenneth B Lee, Jr.
(74) *Attorney, Agent, or Firm* — Prol Intellectual Property Law, PLLC; H. Kenneth Prol

(57) ABSTRACT

A typing profile based mood sensing system may comprise a processor receiving a user identification associated with a personal typing profile identifying a repeated pattern of values for a combination of previously recorded haptic hardware typing or touch behavior parameters, and a piezo haptic keyboard controller operably connected to piezo electric elements situated beneath keys of the piezo keyboard detecting current haptic hardware typing or touch behavior parameters describing deformation characteristics for the piezo electric elements. The processor may compare the user personal typing behavior profile against the current haptic hardware typing or touch behavior parameters to identify a user personal typing behavior profile value change, and associate the change with a mood-based haptic keyboard setting adjustment. The piezo haptic keyboard controller may apply the mood-based haptic keyboard setting adjustment to operation of the haptic keyboard or touchpad.

20 Claims, 8 Drawing Sheets

(56) References Cited

U.S. PATENT DOCUMENTS

| | | |
|---|---|---|
| 5,463,388 A | 10/1995 | Boie |
| 5,825,352 A | 10/1998 | Bisset |
| 5,861,583 A | 1/1999 | Schediwy |
| 5,887,995 A | 3/1999 | Holehan |
| 6,147,680 A | 11/2000 | Tareev |
| 6,188,391 B1 | 2/2001 | Seely |
| 6,239,790 B1 | 5/2001 | Martinelli |
| 6,532,824 B1 | 3/2003 | Ueno |
| 6,574,095 B2 | 6/2003 | Suzuki |
| 6,680,731 B2 | 1/2004 | Gerpheide |
| 6,703,550 B2 | 3/2004 | Chu |
| 6,822,635 B2 | 11/2004 | Shahoian |
| 6,882,337 B2 | 4/2005 | Sheffer |
| 7,336,260 B2 | 2/2008 | Martin |
| 7,439,962 B2 | 10/2008 | Reynolds |
| 7,486,279 B2 | 2/2009 | Wong |
| 7,523,410 B2 | 4/2009 | Rekimoto |
| 7,535,454 B2 | 5/2009 | Jasso |
| 7,741,979 B2 | 6/2010 | Schlosser |
| 7,808,488 B2 | 10/2010 | Martin |
| 8,144,453 B2 | 3/2012 | Brown |
| 8,159,461 B2 | 4/2012 | Martin |
| 8,164,573 B2 | 4/2012 | DaCosta |
| 8,199,033 B2 | 6/2012 | Peterson |
| 8,248,277 B2 | 8/2012 | Peterson |
| 8,248,278 B2 | 8/2012 | Schlosser |
| 8,279,052 B2 | 10/2012 | Heubel |
| 8,294,600 B2 | 10/2012 | Peterson |
| 8,294,677 B2 | 10/2012 | Wu |
| 8,373,664 B2 | 2/2013 | Wright |
| 8,477,113 B2 | 7/2013 | Wu |
| 8,508,487 B2 | 8/2013 | Schwesig |
| 8,542,134 B2 | 9/2013 | Peterson |
| 8,581,710 B2 | 11/2013 | Heubel |
| 8,633,916 B2 | 1/2014 | Bernstein |
| 8,674,941 B2 | 3/2014 | Casparian |
| 8,749,507 B2 | 6/2014 | DaCosta |
| 8,773,356 B2 | 7/2014 | Martin |
| 8,797,295 B2 | 8/2014 | Bernstein |
| 8,842,091 B2 | 9/2014 | Simmons |
| 9,178,509 B2 | 11/2015 | Bernstein |
| 9,274,660 B2 | 3/2016 | Bernstein |
| 9,280,248 B2 | 3/2016 | Bernstein |
| 9,318,006 B2 | 4/2016 | Heubel |
| 9,336,969 B2 | 5/2016 | Takashima |
| 9,400,582 B2 | 7/2016 | Bernstein |
| 9,430,145 B2 * | 8/2016 | Treskunov ............ G06F 3/04886 |
| 9,430,626 B1 * | 8/2016 | Rome ...................... G06F 21/32 |
| 9,477,342 B2 | 10/2016 | Daverman |
| 9,535,557 B2 | 1/2017 | Bernstein |
| 9,829,982 B2 | 11/2017 | Bernstein |
| 10,089,840 B2 | 10/2018 | Moussette |
| 10,120,450 B2 | 11/2018 | Bernstein |
| 10,203,873 B2 * | 2/2019 | Marsden ................ G06F 3/016 |
| 10,860,112 B1 | 12/2020 | Knoppert |
| 2006/0109255 A1 | 5/2006 | Chen |
| 2007/0063987 A1 | 3/2007 | Sato |
| 2007/0273671 A1 | 11/2007 | Zadesky |
| 2008/0098456 A1 | 4/2008 | Alward |
| 2008/0202824 A1 | 8/2008 | Philipp |
| 2008/0259046 A1 | 10/2008 | Carsanaro |
| 2009/0002178 A1 | 1/2009 | Guday |
| 2009/0243817 A1 | 10/2009 | Son |
| 2009/0315854 A1 | 12/2009 | Matsuo |
| 2010/0089735 A1 | 4/2010 | Takeda |
| 2010/0102830 A1 | 4/2010 | Curtis |
| 2010/0110018 A1 | 5/2010 | Faubert |
| 2010/0128002 A1 | 5/2010 | Stacy |
| 2012/0062491 A1 | 3/2012 | Coni |
| 2012/0092263 A1 | 4/2012 | Peterson |
| 2013/0249802 A1 | 9/2013 | Yasutake |
| 2015/0185842 A1 | 7/2015 | Picciotto |
| 2017/0269688 A1 | 9/2017 | Chan |
| 2017/0344117 A1 * | 11/2017 | Yamazaki ............... G06F 3/023 |
| 2018/0074694 A1 | 3/2018 | Lehmann |
| 2018/0225008 A1 * | 8/2018 | Naqvi ................ G06F 21/6245 |
| 2019/0073036 A1 | 3/2019 | Bernstein |
| 2020/0125182 A1 * | 4/2020 | Schipon ............... G06F 3/0233 |
| 2020/0233500 A1 * | 7/2020 | Mannby ................ G06F 3/023 |

FOREIGN PATENT DOCUMENTS

| | | |
|---|---|---|
| KR | 20040081697 A | 9/2004 |
| WO | 2004/042685 A2 | 5/2004 |
| WO | 2004/042693 A1 | 5/2004 |
| WO | 2005/057546 A1 | 6/2005 |
| WO | 2011/056752 A1 | 5/2011 |
| WO | 2011/071837 A2 | 6/2011 |

OTHER PUBLICATIONS

Holleis, P. et al., "Studying Applications for Touch-Enabled Mobile Phone Keypads," Proceedings of the Second International Conference on Tangible and Embedded Interaction (TEI'08), Feb. 18-20, 2008, Bonn, Germany, pp. 15-18.

Westerman, W. et al., "Multi-Touch: A New Tactile 2-D Gesture Interface for Human-Computer Interaction," Proceedings of the Human Factors and Ergonomics Society 45th Annual Meeting, Oct. 2001, pp. 632-636.

* cited by examiner

SYSTEM AND METHOD FOR MOOD DETECTION VIA PIEZO HAPTIC KEYBOARD DYNAMICS

FIELD OF THE DISCLOSURE

The present disclosure generally relates to a keyboard assembly of information handling systems. The present disclosure more specifically relates to identifying user's mood via a piezo electric haptic keyboard personal typing profile determined based on piezo haptic keyboard and touchpad dynamics.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a keyboard for manual input of information by the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
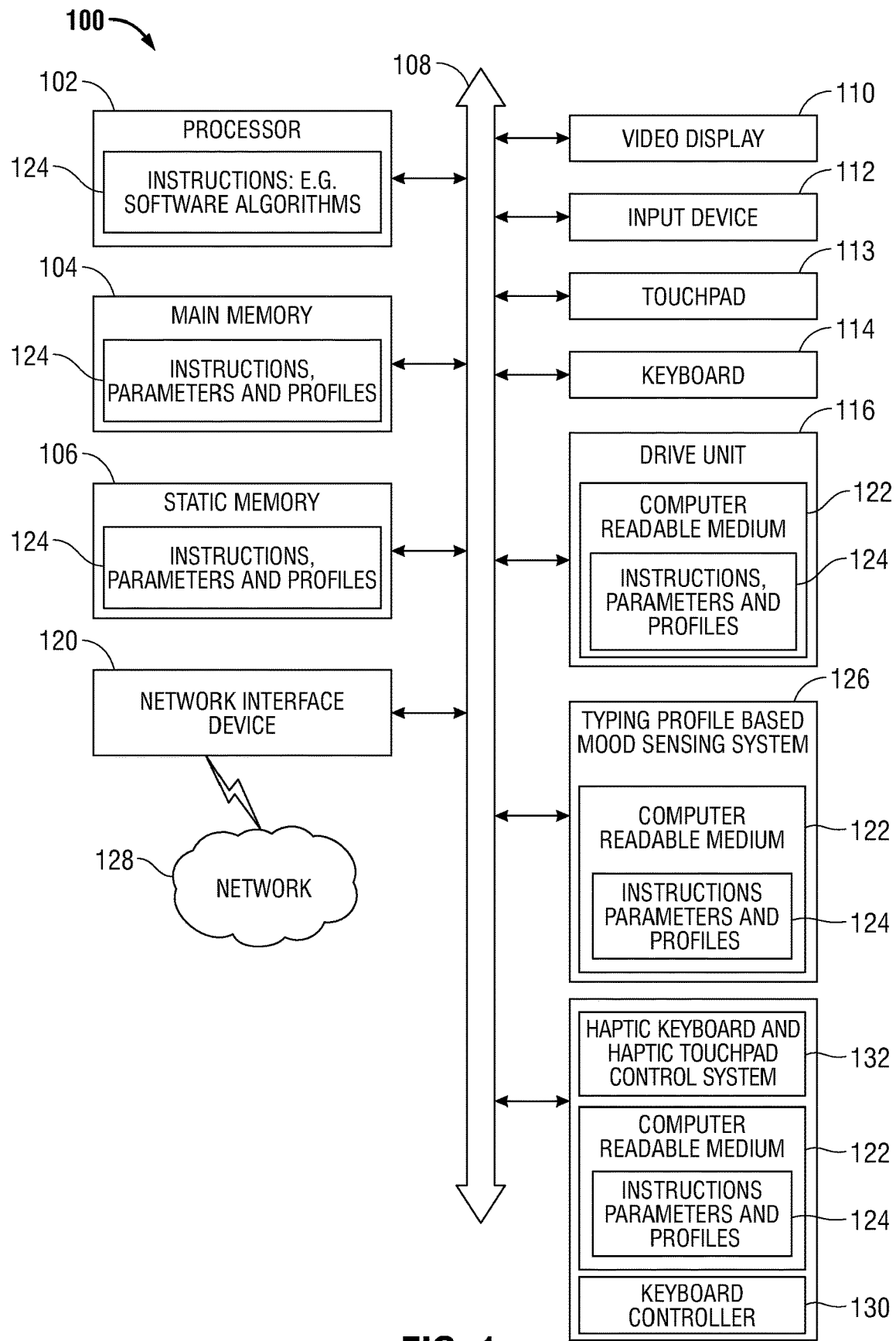
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

User demand drives the market for mobile information handling systems toward ever-slimmer, more lightweight laptop devices, prompting a need for ever-thinner keyboards. In order to decrease the thickness of laptop systems, keyboards employing piezo haptic technology that allows for monitoring of user typing behaviors may be used.

A solid-state piezoelectric keyboard provides a thinner, more light-weight improvement over traditional scissor mechanism keyboards. The use of piezoelectric elements within the keyboard may eliminate the use of other devices such as a scissor mechanism that are used to maintain a keycap of a key above an electrical connection or for a dive board type mechanism under a touchpad. Instead, such piezoelectric elements may reduce or eliminate those mechanical elements that may fail after a number of actuations while also reducing the thickness of the keyboard or the touchpad itself. Instead of the keys of the keyboard requiring travel of a scissor mechanism within a C-cover of the information handling system, the relatively thinner keys defined (either physically or visibly) on the solid-state keyboard of the presently-described information handling system may reduce the physical thickness of the keyboard within the information handling system. Further, the solid-state touchpad may eliminate the dive board mechanism and underlying click switch for selection of items via the mechanically actuated touchpad. This may enable a thinner, more streamlined information handling system.

Embodiments of the present disclosure provide for a keyboard of an information handling system. The keyboard may include, in an embodiment, a coversheet to identify an actuation location of an input actuation device. In an embodiment a support layer may be placed underneath the coversheet to support the coversheet and other layers within the keyboard. The keyboard may, in an embodiment, include a contact foil placed between the coversheet and support layer. In the embodiments presented herein, the keyboard may include a piezoelectric element placed between the contact foil and support layer to receive an applied mechanical stress at the actuation location of the input actuation device. The keyboard of the information handling system, in an embodiment, may include a controller of the information handling system operatively coupled to the contact foil to receive an electric charge from the piezoelectric element placed under the mechanical stress. The controller may also send an electrical haptic feedback control signal to the piezoelectric element of a signal varying in polarity, voltage or current to cause the piezoelectric element to provide haptic feedback at the actuation location.

During operation of the solid-state keyboard or touchpad of the information handling system described in embodiments herein, a key on the keyboard or the touchpad may be actuated by a user pressing down on a specific location. In an embodiment, this specific location may be visually indicated by an alphanumeric symbol such as those found on a QWERTY keyboard, a key pedestal or raised location, or another designation such as a tactile frame or depression in a cover sheet. The actuations of these specific locations by, for example, a user's finger causes a mechanical stress to be applied to the piezoelectric element resulting in the deformation of the piezoelectric element. Upon application of this mechanical stress and the deformation of the piezoelectric element, the piezoelectric element accumulates an electric charge that is passed to a controller of the information handling system via the contact foil described herein. In an embodiment, the controller receives the electrical charge to detect occurrence of a keystroke. A haptic keyboard and touchpad control system may record a character associated with the actuated key and provide a haptic feedback event to the actuated key via a haptic feedback control signal to the piezo electric element or elements. Similarly, if a touchpad is actuated, the haptic keyboard and touchpad control system may record a selection or action associated with the actuated touchpad area and provide a haptic feedback event to the actuation interface area of the touchpad via a haptic feedback control signal to the piezo electric elements.

The piezo keyboard controller in embodiments described herein may use such a method to detect and record various metrics describing the dynamics of the piezo haptic keyboard assembly in use by a user over a training period in which the user is in a calm, baseline mood. Similarly, usage of the haptic touchpad may detect and record various metrics describing the dynamics of haptic touchpad usage via a piezo touchpad controller. For example, such user haptic hardware typing or touch behavior parameters may describe the force of keystrokes, the location of keystrokes (e.g., in the center of a given key or in the corner of that key), duration of keystrokes, and overall typing speed applied by the user. The piezoelectric elements used with the piezo haptic keyboard of the present embodiments may report keystrike force based on charge accumulated which is relative to mechanical force applied. Further, the piezoelectric elements may measure duration of actuation, speed of down stroke or upstroke for sharpness of a keystroke, keystrike location on a key, pauses, and other keystroke factors. Similar haptic hardware typing or touch behavior parameters may be recorded by piezoelectric elements used with the piezo haptic touchpad. Force of touchpad actuation, duration of actuation, down stroke and upstroke sharpness and other factors may be assessed. The combination of specific values for each of these recorded user haptic hardware typing or touch behavior parameters may be specific to individual users in that they repeat as a pattern for combinations of parameters, and changes in these behaviors may be used to gauge a change in the user's mood when the identifying patterns are altered or disrupted. For example, a user may type more forcefully or rapidly when stressed, or may make more mistakes (typing off-center or mistyping) when fatigued.

Further, as a user's mood changes, it may be preferable to change the dynamics of the haptic keyboard response, haptic touchpad response or modify other actions of the information handling system in response. In an embodiment, upon receipt of the electrical charge as an actuation signal of a key or touchpad at the controller, the controller may send an electrical haptic feedback control signal back to the piezoelectric element. Upon application of the electrical haptic feedback control signal on the piezoelectric element by the controller, the piezoelectric element may be mechanically stretched or compressed so as to create a haptic feedback event such as the piezoelectric element warping up or down and returning to its pre-deformed state. This warping of the layers of the piezoelectric element causes the user to feel a haptic sensation at the actuated key or the specific location where the user pressed in order to actuate a key or touchpad. This haptic feedback against the user's finger causes a sensation of pressing a mechanical key thereby creating a feeling to a user that the key was pressed or that a touchpad has been clicked to select an item such as one displayed on a display screen.

By applying voltages of varying magnitude and polarity to each of the piezo elements in a piezo haptic keyboard assembly in such a way, a controller may control the factors influencing a user's tactile experience, including the force she must use to depress a key, the speed and force with which each of the keycaps returns to its neutral position after being depressed, and the sound such an interaction generates. In contrast to conventional keyboard assemblies, each of these factors may be adjusted to, allowing for a wide range of tactile and audio experiences for users. A method leveraging the monitoring of user typing behavior or user touchpad interaction to detect a change in user mood and the ability to adapt the haptic keyboard dynamics based on that change is needed.

The typing profile based mood sensing system in embodiments of the present disclosure address this issue by developing a personal typing profile describing a user's baseline typing behavior or touchpad usage behavior when the user is calm, then comparing these behavioral parameters against later measured values for the same parameters. For example, the typing profile based mood sensing system in embodiments described herein may determine whether a user is typing more or less forcefully or rapidly than she does when calm, or detect an increase or decrease in the precision with which the user is typing. One or more of these detected changes, or combinations of one or more of these changes may be associated with a preset, initial mood classification. For example, a decrease in typing precision may be associated with a state of fatigue. As another example, an increase in typing speed and force may be associated with a state of stress. The typing profile based mood sensing system may detect haptic hardware typing or touch behavior parameters to compare with a user personal typing profile to discern changes in mood. The typing profile based mood sensing system of embodiments herein may utilize haptic hardware typing or touch behavior parameters from just keyboard piezo electric elements in some embodiments. In other embodiments, haptic hardware typing or touch behavior parameters from touchpad usage may be used. In further embodiments, the haptic hardware typing or touch behavior parameters may be drawn from either haptic keyboard typing, haptic touchpad usage, or even from physical surrounding indicators or application usage data as described herein. The term typing profile based mood sensing system does not preclude touchpad haptic hardware parameters or necessarily require keyboard haptic hardware parameters in embodiments herein.

The typing profile based mood sensing system in embodiments of the present disclosure may also confirm this initial mood classification determination based on other received metrics. For example, the typing profile based mood sensing system may also receive user-defined haptic settings the user can input to manually change the dynamics of the haptic keyboard, such as by increasing or decreasing the force required to register a keystroke. As another example, the typing profile based mood sensing system may receive physical surroundings indicators from a plurality of sensors, or gather application usage metrics describing the application the user has open at a given time. One or more of these received metrics, or combinations thereof may also be associated with mood classifications. For example, biometric sensor readings identifying the user with a state of fatigue may be associated with a fatigued mood classification. As another example, application usage data indicating the user is engaged with an entertainment based application (e.g., streaming video) may be associated with a relaxed state. The typing profile based mood sensing system in an embodiment may compare the initial mood classification determined based on detected changes in the user's typing behavior with the mood classification associated with these received metrics in order to confirm a change in user behavior in embodiments described herein.

The typing profile based mood sensing system in embodiments may also automatically adjust the piezo haptic keyboard settings in order to account for this confirmed user mood. For example, the typing profile based mood sensing system may determine the user is in a stressed state, and automatically decrease the duration and intensity of haptic movements following keystrokes in order to allow the user to type more quickly. As another example, the typing profile based mood sensing system may determine the user is in a fatigued state, and automatically increase the duration and intensity of haptic movements following keystrokes in order to keep the user more alert. In yet another example, the typing profile based mood sensing system may determine the user is in a relaxed state, and automatically decrease the force required to register a keystroke. By confirming a mood change of a user associated with changes in haptic hardware typing or touch behavior parameter values through measurements of user-defined haptic settings, physical surroundings indicators, or application usage data, and suggesting changes based on such determined mood changes, the typing profile based mood sensing system in an embodiment may automatically adapt the keyboard dynamics to accommodate a user's mood. In yet other embodiments, by discerning the user's mood with the typing profile based mood sensing system adaptation of other functions of the information handling system may be influenced or adjusted. For example, dimming of display screen light levels may be suspended in the evening when stress is detected in some embodiments. In other example embodiments, running updates or seeking user inputs may be limited during application operation when stress is detected. Several adjustments to information handling system operation or function of various application programs may be made depending upon the mood determination of the haptic system typing profile based mood sensing system of the embodiments herein.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as, various input and output (I/O) devices 112, such as a keyboard 114, a touchpad, a mouse, a video/graphic display 110, or any combination thereof. The information handling system 100 may also include one or more buses operable to transmit communications between the various hardware components. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 122 storing instructions 124 of the haptic keyboard and touchpad control system 132 or the typing profile based mood sensing system 126, and drive unit 116 (volatile (e.g. random-access memory, etc.), non-volatile memory (read-only memory, flash memory etc.) or any combination thereof. The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard 114. Various drivers and control electronics may be operatively coupled to operate input devices 112 such as the haptic keyboard 110 and haptic touchpad according to the embodiments described herein.

The network interface device shown as wireless adapter 120 may provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 or parameters or profiles may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a haptic keyboard and touchpad control system 132 or a typing profile based mood sensing system 126, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. In various embodiments herein, the haptic keyboard and touchpad control system 132 or the typing profile based mood sensing system 126 may be executed by a haptic keyboard controller, a haptic touchpad controller, other type of controller, a processor such as 102 or any combination of the above. Further the typing profile based mood sensing system 126 may be part of the haptic keyboard and touchpad control system 132 or may be a standalone typing profile based mood sensing system 126 in various embodiments.

The disk drive unit 116 and some portion of the haptic keyboard and touchpad control system 132 or the typing profile based mood sensing system 126 may include a computer-readable medium 122 in which one or more sets of instructions 124 such as software may be embedded as well as data storage for parameters utilized by these systems. Similarly, main memory 104 and static memory 106 may also contain a computer-readable medium for storage of one or more sets of instructions, parameters, or profiles 124 including haptic feedback modulation instructions that allow for a user to input a desired level of haptic feedback at a key or location on a touchpad. The disk drive unit 116 and static memory 106 may also contain space for data storage utilized by the haptic keyboard and touchpad control system 132 or the typing profile based mood sensing system 126 such as a personal typing profile database or a mood correlation database for storage of data relating to parameters of a typing or touchpad usage profile and mood classifications as well as storage of modifications to piezoelectric elements operation of the haptic keyboard 114 and haptic touchpad 113 of embodiments herein. Further, the instructions 124 may embody one or more of the methods or logic as described herein. For example, instructions relating to the typing profile based mood sensing system 126 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100.

Main memory 104 may contain computer-readable medium, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The haptic keyboard and touchpad control system 132 or the typing profile based mood sensing system 126 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the haptic keyboard and touchpad control system 132 and the typing profile based mood sensing system 126 either or both of which may be operably connected to the bus 108. The haptic keyboard and touchpad control system 132 or the typing profile based mood sensing system 126 computer readable medium 122 may also contain space for data storage or may other data storage such as for a personal typing behavior profile database or a mood correlation database as described in embodiments herein. The typing profile based mood sensing system 126 may also include use of profiled actuation data for a user's haptic touchpad use characteristics and as such may also be considered a typing or touch profile based mood sensing system in some embodiments herein. The haptic keyboard and touchpad control system 132 may, according to the present description, perform tasks related to transmitting an electrical haptic feedback control signal to a piezoelectric element based on custom or learned optimal haptic settings for a specific user, causing a haptic feedback at a key of the keyboard 114 associated with that piezoelectric element. The typing profile based mood sensing system 126 may provide adjustments to the electrical haptic feedback control signal or other adjustments to the information handling system or operating software applications based on a sensed mood of a current user. In these embodiments, the haptic keyboard and touchpad control system 132 may transmit an electric haptic feedback control signal, as adjusted by the typing profile based mood sensing system 126, to any of a plurality of piezoelectric elements each associated with a key on keyboard 114 (i.e., a QWERTY keyboard), a key pad, or a location on a touchpad.

In an embodiment of the present description, each of the keys of haptic keyboard 114 may be associated with a piezoelectric element or in some embodiments more than one piezoelectric element may be associated with a key. The piezoelectric element may be used to, as described herein, create an electrical charge relative to a key on the keyboard 114 and send that electrical charge as an actuation signal to a controller. In an embodiment, the controller may receive the electrical charge as an actuation signal and the haptic keyboard may register the keystroke and associated alpha-numeric character and send an electrical haptic feedback control signal to the piezoelectric element. Upon application of the electrical haptic feedback control signal at the piezoelectric element (i.e., having a specific current and voltage) associated with the actuated key of keyboard 114 causes the piezoelectric element to convert that electrical haptic feedback control signal into a mechanical compression or stretching of piezoelectric material which may cause an upward or downward warping of the piezoelectric element. The mechanical warping of the piezoelectric element due to the application of the electrical haptic feedback control signal to the piezoelectric element may be felt by a user who actuated the key of keyboard 114.

In similar operation, one or more piezoelectric elements may be actuated by a touchpad actuation at an interface location of a haptic touchpad 113. The electric charge sensed by the one or more piezoelectric elements may be detected at a controller and the haptic keyboard and touchpad control system 132 may register selection of a displayed item or another action. Further, the haptic keyboard and touchpad control system 132 will provide a haptic feedback control signal to the one or more piezoelectric elements to create a haptic feedback event at the interface location on the haptic touchpad 113.

In an embodiment, the keyboard controller 130, or a touchpad controller which may be merged with 130 or independent, may execute instructions, parameter, and profiles 124 to enact the functions of the piezo haptic keyboard 114 as described herein. The typing profile based mood sensing system 126 in an embodiment may include one or more sets of instructions that, when executed by a keyboard controller 130, causes adjustment to the setting for current, voltage, polarity or other aspects of the haptic feedback control signal to be applied to a piezoelectric element upon detection of an electrical charge from the piezoelectric element. The one or more sets of instructions of the haptic keyboard and touchpad control system 132 with the typing profile based mood sensing system 126 may also include one or more sets of instructions that, when executed by the keyboard controller 130, determines which of any plurality of keys of haptic keyboard 114 were activated. In an example, the keyboard controller 130 may receive, from a piezoelectric element, an electric charge and produce an haptic feedback control signal to the piezoelectric element.

In an embodiment, the haptic keyboard and touchpad control system 132 and the typing profile based mood sensing system 126 may also include one or more sets of instructions that, when executed by a processor, adjusts the polarity, voltage, or current of haptic response signals applied to any piezoelectric element for either a haptic keyboard or a haptic touchpad. This adjustment may be completed based on a determined mood of the user, or upon the desired, custom, or learned haptic responses from the piezoelectric elements, the lifespan of the piezoelectric element, the electrical characteristics of the piezoelectric element, the mechanical characteristics of the piezoelectric element, or combinations thereof. Because these characteristics may be different from one piezoelectric element to the other, the electrical haptic feedback control signal applied any given piezoelectric element by the keyboard controller 130 may be customized to produce a specific level of haptic feedback at any given key of keyboard 114 and this may depend on the sensed haptic hardware typing or touch behavior parameter values detected by the typing profile based mood sensing system 126 and correlated to a mood for shift in haptic performance or adjustment to other operating factors of the information handling system. In an embodiment, the keyboard controller 130 or a processor 102 of the information handling system 100 executing code of the typing profile based mood sensing system 126 may include a look-up table correlating changes detected in the haptic hardware typing and touch parameters of a user's personal typing profile and correlation to a sensed mood change. In some embodiments, the typing profile based mood sensing system 126 may utilize a machine learning classifier to identify a mood classification based on the combination and value shift levels of measured haptic hardware typing or touch behavior parameters from those of a stored personal typing profile for a user. In embodiments, the keyboard controller 130 of the information handling system 100 may access the look-up table of a mood correlation database to assess mood classifications and in order to determine how a current pulse is to be applied to any given piezoelectric element and at what polarity or voltage of the haptic response signal to the piezoelectric elements or what other operational changes to function of the information handling system or application programs may be instituted due to the mood classification determination.

The one or more sets of instructions of the haptic keyboard and touchpad control system 132 or the typing profile based mood sensing system 126 may also include one or more sets of instructions that, when executed by the keyboard controller 130, causes any number of subsequent current pulses to be applied to any piezoelectric element. In this embodiment, the subsequent electrical pulses may cause a haptic feedback event to a user who actuated a key of haptic keyboard 114 or a touch location of a haptic touchpad 113 or changes in magnitude or pulses of haptic feedback to emulate the feel of a mechanical keystroke including adjustment of the feel of depth of the haptic-emulated keystroke or to emulate a feel of a mechanical touchpad. In other embodiments, the haptic feedback of the keyboard 114 may not need to emulate a keystroke of a mechanically actuated keyboard or a click of a mechanically actuated touchpad but instead provide a distinct haptic feel to indicate that a keystroke or touch actuation has occurred on the solid-state keyboard 114 or solid-state touchpad 113 to the user.

In an embodiment, the haptic keyboard and touchpad control system 132 or the typing profile based mood sensing system 126 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
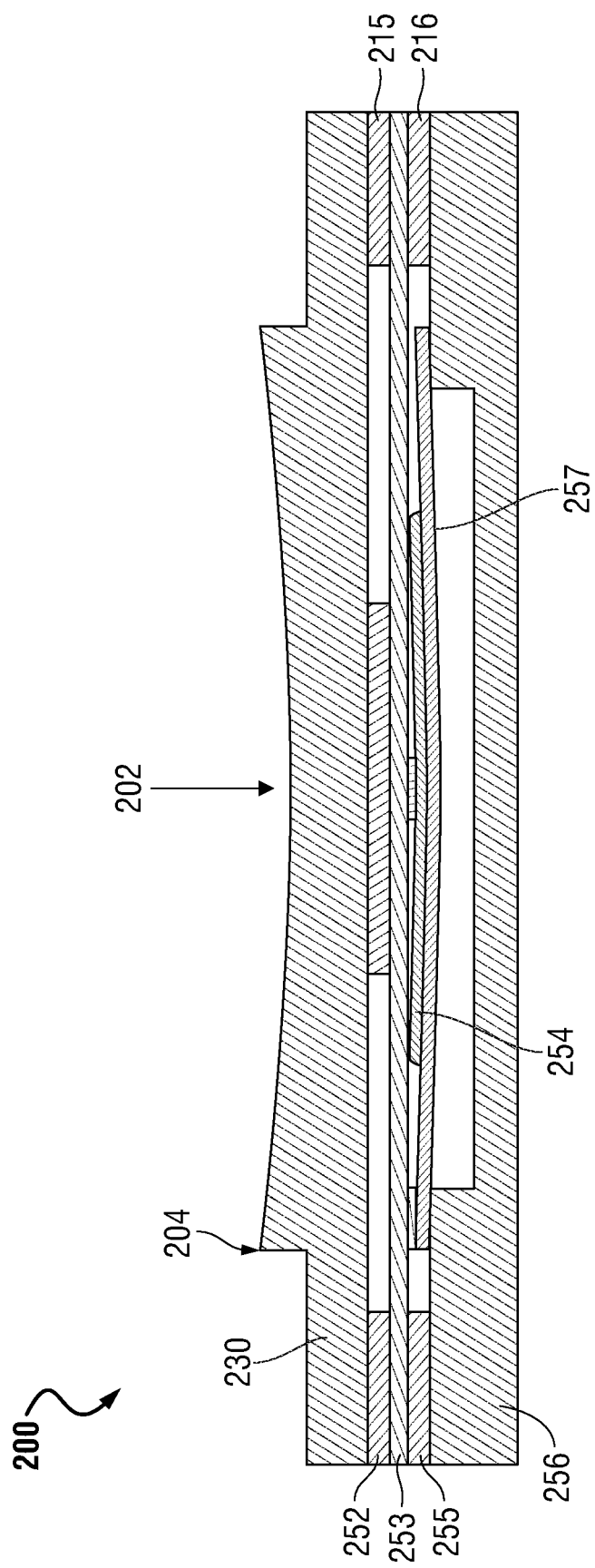
FIG. 2 is cross-sectional graphical view of a piezo haptic keyboard layer stack according to an embodiment of the present disclosure.

FIG. 2 is a side cut-out view of a key 200 of a keyboard implementing a piezoelectric element deforming under pressure applied by a user according to an embodiment of the present disclosure. As described herein, user demand drives the market for mobile information handling systems toward ever-slimmer, more lightweight laptop devices, prompting a need for every-thinner keyboards. In order to decrease the thickness of laptop systems, keyboards may employ piezo haptic technology that is slimmer than tradition mechanical keyboard systems. In an example embodiment, the keyboard with piezo haptic technology may mimic the tactile sensation of traditional mechanical keyboards, but may replace a key cap, scissor mechanism, and rubber dome of a traditional mechanical key assembly with a keyboard cover sheet lying atop a deformable piezo element layer.

According to an embodiment, the key 200 may be formed of a plurality of layers, one layer of which is a piezoelectric element 220. Although FIG. 2 shows a cross-sectional view of a single key 200, the present specification contemplates that a keyboard may also include a plurality of these similar keys 200 arranged as, for example, a QWERTY-type keyboard. The present specification also contemplates that, in addition to a keyboard, an information handling system described herein may also include a touchpad including a piezoelectric element 220 as described herein. Consequently, FIG. 2 is not intended to be limiting but merely intended as a description of operation of any type of input device contemplated by the present disclosure.

The key 200 includes a coversheet 205. The coversheet 205 may be made of any type of elastically resilient material. The elastically resilient material may allow, at least, a portion of the key 200 to be deformed upon application of a pressure from a user's finger. Upon withdrawal of the pressure from the user's finger, the material the coversheet 205 is made of allows the coversheet 205 of the key 200 to bend back to its pre-deformed state. In an embodiment, the resilient material may allow the coversheet 205 to travel a minimal distance and still deform a piezoelectric element 220. For example, a distance of between 0.01 mm and 2 mm. In an embodiment, the distance is between 0.05 mm and 0.15 mm. In an embodiment, the distance is 0.1 mm.

In an embodiment, the shape of the coversheet 205 may have a selection of key pedestals 206 of various sizes and shaped so as to conform to a user's finger. In an embodiment, in order to shape the coversheet 205, the material used to form the coversheet 205 may be subjected to an injection molding process. As such, a top portion of the coversheet 205 may be formed to be ergonomically beneficial to a user's actuation such as by conforming to the user's fingers and including a pedestal 206 to highlight the key location, for example. In other embodiments, no key pedestals may be formed and a key location may be described in coversheet 205 via markings, depressions, key framing, or other methods. The injection molding process may be completed prior to the installation of the coversheet 205 into the remaining layers within the keyboard 200 as described herein. Any number of processes may be included with the injection molding process. In an embodiment, the injection molding process used to form the coversheet 205 may include forming a number of holes within a sheet of acrylonitrile butadiene styrene (ABS). These holes may correlate with a number of keys on a keyboard. The formation of the coversheet 205 may continue with injection molding a translucent ABS through the holes to form a raised portion correlating with each of the number of keys on the keyboard. Opposite the raised portions a number of runners may be machined away to accommodate for receipt of other layers of the keyboard such as each of the piezoelectric elements. The surface of the coversheet on which the raised portions are formed may be painted and any number or type of graphics may be laser etched on each raised portion indicating a specific key of the keyboard.

In other embodiments, the coversheet of the C-cover may include a plurality of vias for keys 200 having a cover sheet 205 or cap for each key. A key pedestal 206 for each key 200 in a solid-state keyboard of the present embodiments may be disposed through the vias in the C-cover in such embodiments. Each haptic key of the haptic keyboard in such an embodiment may include a cover layer similar to those described directly above that protrudes through the key vias in the coversheet 205. Layering under the coversheet may include material layers that are hydrophobic or have other properties. Though gaps between haptic keys and key vias may be minimized, such gaps may be useful for cooling ventilation of the base chassis or for allowing backlighting to frame the haptic keys. Similarly, a touchpad top touch interface layer may be attached under the coversheet 205 to seamlessly provide a designated touchpad area in the C-cover coversheet for access to the top cover sheet 205 of the solid state touchpad in some embodiments. Any combination of a continuous coversheet for haptic keys and vias in the coversheet for placement of haptic keys of a keyboard coversheet layer are contemplated in various embodiments. Further, it is contemplated that in some embodiments one or the other of a haptic keyboard or haptic touchpad may be used with a keyboard having mechanically actuated keys or a touchpad with a mechanically actuated diving board mechanism.

The key 200 may further include a number of adhesive layers 215 that physically couple the various layers of the key 200 together. In an embodiment, a first adhesive layer 215 may be formed on the coversheet 205 to adhere the coversheet 205 to the contact foil 210. The first adhesive layer 215 may include the placement of the adhesive at locations that may enhance the movement and prevent the hindrance of the actuation of the coversheet 205. In a specific embodiment, the first adhesive layer 215 may include placing the adhesive along borders of the key 200 as well as placing the adhesive at a central location of the key 200.

The contact foil 210 may be made of any elastically resilient material that, when the coversheet 205 of key 200 is actuated or the contact foil 210 is bent towards a lower portion of the key 200, returns to its original state when the key 200 is no longer being actuated. The contact foil in an embodiment may be a flexible material, such as polyethylene terephthalate (PET) serving as a polyester printed circuit board or other type of flexible printed circuit board, in several example embodiments. The contact foil 210 may include a number of metal traces formed on one or more of its surfaces that electrically and communicatively couple each of the corresponding piezoelectric element 220 of key 200 to a keyboard controller such as a processor of an information handling system that includes a haptic feedback keyboard control system such as described herein. Formation of metal traces may be made according to a variety of methods including photolithographic techniques for applying metal or lamination of copper strips or other metal layers.

In an embodiment, portions of the contact foil 210 may be physically coupled to a support plate 230 via a second layer of adhesive 216. The location of the placement of the second adhesive layer 216 may include placing the adhesive along borders of the key 200.

In an embodiment presented herein, the piezoelectric element 220 may include a first portion 222 that may be any solid piezoelectric material that accumulates an electric charge when a mechanical stress is applied to it or specifically, in the embodiments presented herein, when the solid material is deformed. Solid materials used to form the piezoelectric element 220 may include crystals, ceramics, or protein layers, among other types of materials. For ease of explanation, the piezoelectric element 220 may be made of a type of ceramic although the present specification contemplates the use of other types of piezoelectric materials.

The piezoelectric element 220 may be housed over a cavity 231 formed in the support plate 230. The piezoelectric element 220 may comprise two portions 222 and 225 each electrically coupled via electric contact points such as soldering points 235 and 240, respectively, to a different electrical trace on the bottom surface of the contact foil 210. The first portion 222 may be a ceramic disc in an embodiment. Second portion 225 of the piezoelectric element 220 may be a metal plate or ring, such as a brass plate, that extends beyond the edges of cavity 231. The first portion 222 and the second portion 225 may be operatively coupled via adhesive including conductive adhesives. The soldering points 235 and 240 may be silver solder contact points for operative electrical coupling to metal traces on the bottom surface of contact foil 210. As so oriented, the first soldering point 235 and second soldering point 240 may be formed to receive an electrical charge upon deflection of the piezoelectric element 220 as a user actuates the key 200. The brass plate 225 supports deflection of the piezoelectric element 220 into the cavity 231 to detect mechanical actuation of the key 200. In an embodiment, the support plate 230 may have a cavity 230 formed therein such that the piezoelectric element 220 may be allowed to be deflected therein when the key 200 is actuated by a user and cavity 231 may be an aperture or hole through support plate 230 or may be a depression or hole in support plate 230 that does not pass through 230.

In an embodiment presented herein, the piezoelectric element 220 may be any solid material that accumulates an electric charge when a mechanical stress is applied to it or specifically, in the embodiments presented herein, the solid material is deformed. Solid materials used to form the piezoelectric disk 222 or other piezoelectric material as part of a first portion 222 of the piezoelectric element 220 may include crystals, ceramics, biological matter, protein layers, among other types of materials. For ease of explanation, the piezoelectric disk material 222 may be made of a type of ceramic although the present specification contemplates the use of these other types of materials.

During operation of the key 200, the contact foil 210 may receive an electrical charge from the piezoelectric element 220 at the metal traces on the bottom surface of the contact foil 210 that conduct the electrical charge to the processor or other keyboard controller associated with the key 200. For example, as the piezoelectric disk material 222 is compressed by deflection and the metal plate or ring 225 warped downward toward the cavity 231 within support plate 230, a change in voltage may be detected. The electrical charge created when the user actuates the key 200 and the piezoelectric element 220 is subjected to a mechanical stress may be detected between soldering points 235 and 240. The electrical charge may be communicated down metal traces formed on the contact foil 210 to a controller (not shown).

The metal traces formed on the contact foil 210 may further be used to conduct a return electrical haptic feedback control signal from the controller to the piezoelectric element 220 so that the voltage and current of the return electrical haptic feedback control signal may cause the piezoelectric element 220 to warp upward or downward before returning to a planer form as required to cause a specified haptic response to the user via coversheet 205. For example, this electrical haptic feedback control signal may have a certain voltage, current, and polarity (−,+) sufficient to render the piezoelectric material of the piezoelectric element 220 to cause a haptic event or sound. Such a response signal may be a sine wave, a square wave, a pulsed signal, or other waveform of changing current, voltage, or polarity applied to the piezoelectric element 220. This warping of the piezoelectric element 220 may cause a haptic feedback presented at the key 200 via the contact foil 210, adhesive 215, and coversheet 205 that the user may feel. Upon receiving an actuation signal, the controller sends an electrical haptic feedback control signal back to the piezoelectric element 220 via the metal traces formed on the contact foil 210, through the soldering points 235 and 240 and to a conductive layer of metallic plate or ring 225 formed below the piezoelectric disk material 222.

Upon receiving an actuation signal, the controller sends an electrical haptic feedback control signal back to the piezoelectric element 220 via the metal traces formed on the contact foil 210, through the soldering points 235 and 240 and to a conductive layer of metallic plate or ring 225 formed below the piezoelectric disk material 222. The conductive layer of metallic plate or ring 225 may apply the electrical haptic feedback control signal to the piezoelectric disk material 222 so as to cause the piezoelectric disk material 222 to stretch or shrink depending on the polarity of the signal applied. For example, a negative signal applied to piezoelectric disk material element 222 relative to the charge at adhesively attached metallic plate 225 may cause piezoelectric disk 222 to expand or stretch in embodiments herein. This may cause metallic plate 225 to warp downward. Reversing polarity to the piezoelectric disk 222 may cause the piezoelectric disk 222 to compress or shrink and metallic plate 225 may warp upwards. The principle of haptics applied to the piezoelectric disk 222 includes an input voltage that is applied through the two electrodes (voltage change as sine wave, square wave etc.) to generate movement on piezoelectric material 222 of the piezoelectric element 220 and a warping of the metallic layer or disk 225.

This haptic response signal is used to cause a haptic tactile feedback such as a depression and return of the key 200 or a haptic "click" of a touchpad and which may be accompanied by a sound. Such an electrical haptic feedback control signal, such as a sine wave signal, or other haptic response signals with varying polarities or voltage and current may be used by the keyboard controller to create the haptic feedback felt by the user as described herein. In these embodiments, the electric charge sent from the piezoelectric element 220 to the keyboard controller and the electrical haptic feedback control signal sent from the controller to the piezoelectric element 220 may propagate along the two metal traces formed on the bottom surface of the contact foil 210. The contact foil 210 may therefore, in an embodiment, include double the number of metal traces on its bottom surface as that of the number of piezoelectric elements 220 used to form a keyboard that includes multiple keys 200. This haptic feedback may be relayed to the user within microseconds of the user actuating the key 200 such that the user physically detects a sensation that the key 200 was pressed. This sensation felt by the user may be present despite no actual mechanical devices such as a scissor mechanism or other types of keyboard mechanical devices being present among the layers of the key 200. The signal to the piezoelectric element 220 may vary magnitude and pulsing to create the desired haptic response at key 200.

In some embodiments, the controller may apply a series of voltage pulses to the piezo electric element 220, via the contact foil 210, causing the piezo element 220 to vibrate, pulse, or move between its upward warped, downward warped, or neutral positions over a preset time period. In addition, by applying voltage of varying magnitude or polarity to the piezo element 220, the controller may deform the piezo element 220, to a slightly upward warped position, or slightly downward warped position which may effectively produce a haptic feedback event.

Magnitude of upward or downward warping, speed of changes in switching between upward, downward or neutral positions, and duration as well as signal shape, bursts, intervals of the haptic feedback control signal to the piezoelectric element 220 may determine the haptic feedback event that may be experienced by a user at the haptic keyboard or the haptic touchpad. Further, aspects such as force required to register a keystroke or touch event or the location of a keystrike on a haptic key required to register a keystroke may also be adjusted in some embodiments. These factors of modification to the haptic feedback control signal or the changes in aspects for the haptic keyboard or haptic touchpad for actuation may be adjusted in some embodiments depending on the mood detected relative to the user's personal typing profile by the typing profile based mood sensing system of embodiments herein.

The controller applying voltages to the contact foil 210 in such an embodiment may control several factors describing the dynamics of the haptic keyboard assembly. For example, by setting a baseline voltage applied to the piezo element 220 to slightly deform the piezo element 220 in an embodiment, or increasing the threshold voltage received at the controller necessary to register a keystroke, the controller may set the downward force required to register a keystroke, as well as roughly define the area (e.g., in the center of the key, or on the edges of the key) in which a user must apply that force. A corner strike 204 may be less likely to cause optimal deflection of the piezo element 220, in comparison to application of downward pressure 202 directly in the middle of the piezo element 220. Because such a corner strike 204 causes the piezo element 220 to deflect less than a pointed, center key strike would, a user performing a corner strike 204 in an embodiment may need to provide greater downward force in the corner strike 204 to cause the controller to register a keystroke has occurred. In this way, adjustments of the piezo-electric keyboard function in registering typing may also be set.

As another example, the controller may set the intensity or force with which a key provides a haptic response following a keystroke by causing the piezo element 220 to rotate between its upward warping, downward warping, and neutral position. In other words, the controller may set the cycle of movement, pulsing, and intensity of the piezo element 220 movement by adjusting the amplitude, polarity, pulsing, or waveform of the haptic control signal provided to a piezo electric element 220. The controller in another example may set the duration of such a haptic response by adjusting the period of haptic response, or the duration of time between detection of the keystroke and deflection of the piezo element 220. Movement or vibration sharpness in an embodiment may refer to the amount of time that is allowed to pass between detection of a keystroke and initiation of a haptic response. For example, a controller in an embodiment may receive a voltage generated at the solder points 235 and 240 via the contact foil 210 when the piezo element 220 warps downward under user-applied force, and may respond by transmitting a haptic voltage signal causing the piezo element 220 to warp upward, or to move between upward and downward warped positions. The controller in such an embodiment may affect the sharpness of a vibration by allowing a shorter or longer time period to elapse between receipt of the voltage indicating the piezo element 220 has been deformed downward under user-applied pressure and transmission of the responsive haptic voltage signal causing the haptic movement (e.g. upward or downward warping) of the piezo element 220. The haptic response may be a vibration, a click, a depression followed by an upward motion, or a more nuanced movement invoked by the piezo-electric element 220.

The controller in some embodiments may also cause a piezo element 220 to vibrate or otherwise move in response to a haptic response control signal for a prolonged period, in a burst under certain conditions. For example, certain keys may be used as hot keys or controller keys for certain applications in an embodiment. A user playing a video game may use the "F" key to fire a weapon, for example. In some embodiments, the controller may set these hot buttons or controller keys to deliver such a burst or prolonged vibration in response to certain instructions received from the corresponding application (e.g., computer game). For example, the "F" key used to fire a weapon in an embodiment may deliver a burst of vibration or another movement when the weapon the user is attempting to fire is out of ammunition. In another example embodiment, the piezo element 220 situated beneath the touchpad may deliver a burst vibration to indicate the player has been injured. The controller in such embodiments may control the duration of such bursts, and the interval between the bursts by setting the number of voltage pulses, and the timing between them that the contact foil 210 applies to the piezo element 220.

The controller applying voltages to the contact foil 210 in an embodiment may control the several factors describing the dynamics of each piezo element 220, individually, in such a way. In other words, the controller in an embodiment may apply different piezo haptic settings to different piezo elements, operating simultaneously. For example, piezo elements situated beneath two separate keys may operate according to separate dynamics, based on voltages applied by the controller, separately, to each of those piezo elements. As another example, piezo elements situated beneath the touch pad may operate according to separate dynamics than piezo elements situated beneath keys on the cover sheet 205. In still another example, piezo elements situated in one region of the touch pad may operate according to separate dynamics than piezo elements situated beneath another region of the touch pad.

FIG. 2 shows an image of a single key 200. The present specification contemplates that a plurality of keys 200 may be formed alongside each other in order to form, for example, a number pad, a keyboard, or a combination thereof. Consequently, although the features of the key 200 depicted in FIG. 2 apply to a single key 200, the present specification contemplates that any number of keys 200 may be formed on the keyboard so as to allow for the formation of an input device such as a keyboard. The keys 200 may be of any size (e.g., spacebar, tab key, or the like) and depending on size may include more than one piezoelectric element 220 associated with it. As the user actuates each of the keys 200, a haptic feedback may be felt by the user so as to present to the user a sensation that the key was pressed. This operation of key 200 may be conducted every time the user actuates the key 200.

The formation of the key 200 may, in the embodiments presented herein, provide for a keyboard that has a relatively shorter distance of key travel as compared to those keyboards that implement mechanical devices such as a scissor mechanisms and key caps. In an embodiment, the distance of travel of the key 200 may be smaller than 0.1 mm. With the shorter distance of key travel, the overall thickness of the keyboard placed within an information handling system may be reduced. This increases the available footprint within a base chassis of, for example, a notebook-type information handling system that may be used for more or larger components (e.g., batteries) to be placed within the base chassis. Additionally, or alternatively, the reduction in thickness of the keyboard may reduce the overall thickness of the information handling system improving the aesthetics of the design of the information handling system. This reduction in size of the information handling system may also result in the reduction of the weight of the information handling system thereby increasing the portability of the information handling system by the user.

The keys 200 of the present embodiments also include no moving mechanical parts.

With the absence of mechanical moving parts, the key 200 of the presently described embodiments may be relatively more robust thereby increasing the useful life of the key 200. This may increase user satisfaction over the useful lifetime of the information handling system.

Figure 3:
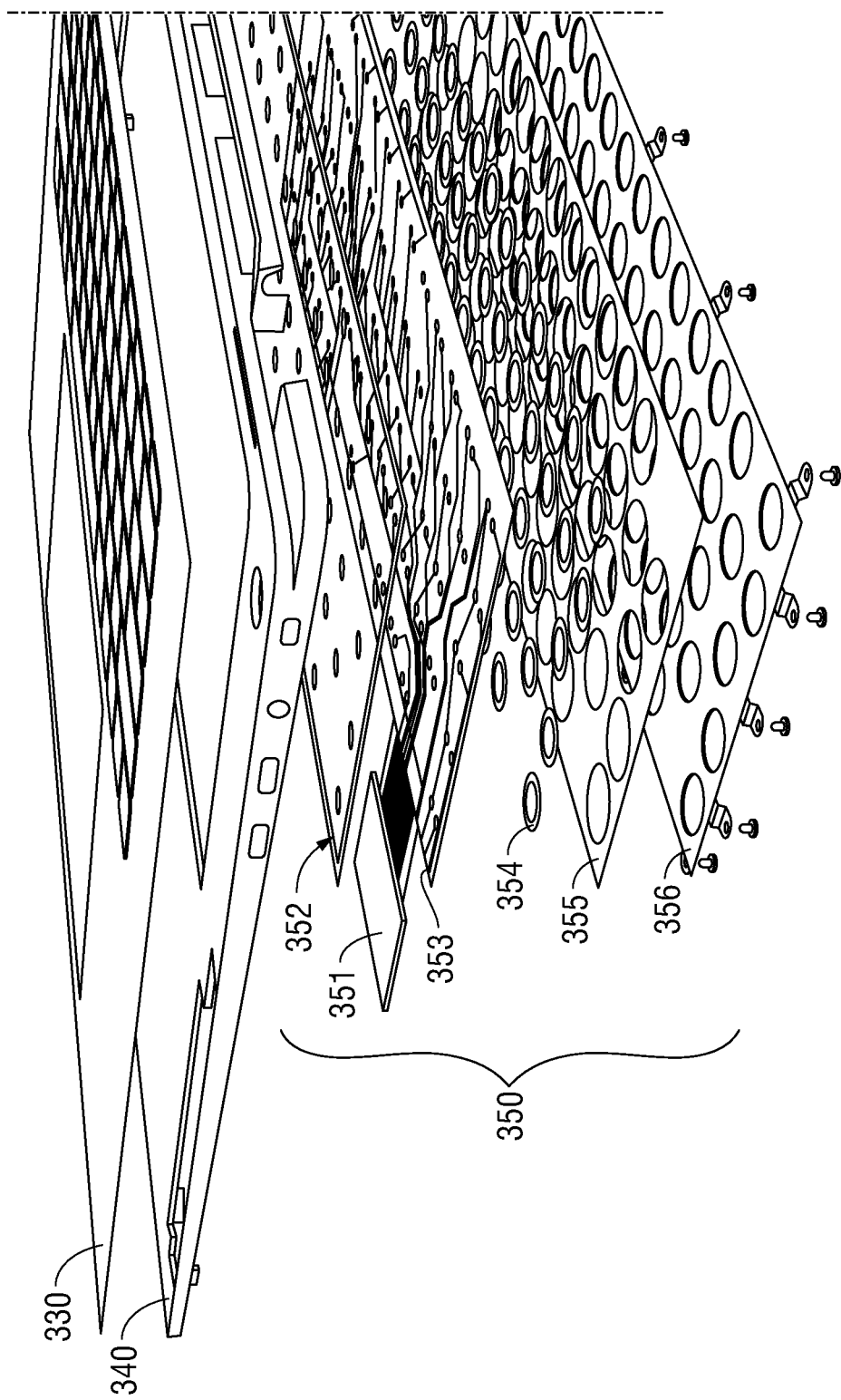
FIG. 3 is an exploded perspective graphical view of a piezo haptic keyboard layer stack according to an embodiment of the present disclosure.

FIG. 3 is an exploded perspective graphical view of a piezo haptic keyboard layer stack including a controller setting and recording various dynamics of a plurality of piezo electric elements according to an embodiment of the present disclosure. The keyboard stack up 300 shows a plurality of keys, similar to those described in connection with FIG. 2, arranged so as to receive input from a user at multiple keys. FIG. 3 also shows a top coversheet 305 having both a keyboard 301 and a touchpad 302. Either or both of the keyboard 301 and touchpad 302 may be haptic systems as described in embodiments herein. In an embodiment, the keys may be arranged similar to a QWERTY design of a keyboard 301. However, other arrangements of any alphabetic, numeric, or symbolic keys is contemplated by the present description.

The keyboard stack up 300 may include several layers similar to those described in connection with FIG. 2. In an embodiment, the keyboard stack up 300 includes a coversheet layer 305. The coversheet layer 305 may be made of any type of elastically resilient material. Coversheet layer 305 may include a plurality of key designations, such as key pedestals as shown in keyboard 301 and a touchpad 302 area designation. The elastically resilient material may allow, at least, a portion of the coversheet layer 305 to be deformed upon application of a pressure from a user's finger. Upon withdrawal of the pressure from the user's finger, the material the coversheet layer 305 is made of allows the coversheet layer 305 of the key to bend back to its pre-deformed form. In an embodiment, the resilient material may allow the coversheet layer 305 to travel a distance of between 0.01 mm and 2 mm.

In an embodiment, the shape of the coversheet layer 305 may be such so as to conform to the user's fingers. In an embodiment, in order to shape the coversheet 305, the material used to form the coversheet 305 may be subjected to an injection molding process. As such, a top portion of the coversheet layer 305 may be formed to be ergonomically beneficial to a user's actuation such as by providing a tactile key location designation and conforming to the user's fingers, for example. The injection molding process may be completed prior to the installation of the coversheet 305 into the remaining layers within the keyboard 300 as described herein. Any number of processes may be included with the injection molding process, including forming a number of holes correlated with a number of keys 301 on the keyboard 300 within sheet of ABS, and injection molding a translucent ABS through the holes to form a raised portion correlating with each of the number of keys 301 on the keyboard 300. Opposite the raised portions a number of runners may be machined away to accommodate for receipt of other layers of the keyboard such as each of the piezoelectric elements 320.

In other embodiments, the coversheet of the C-cover 335 may include a plurality of vias for keys 301 having a cover sheet 305 or cap for each key 301. A key pedestal for each key 301 in a solid-state keyboard of the present embodiments may be disposed through the vias in the C-cover 335 in some example embodiments. Similarly, it is contemplated that coversheet layer 305 may include a touchpad via as a window for a touchpad interface surface of a solid state touchpad according to embodiments. Each haptic key of the haptic keyboard in such an embodiment may include a cover layer similar to those described directly above that protrudes through the key vias in the coversheet 305. Layering under the coversheet may include material layers that are hydrophobic or have other properties. Though gaps between haptic keys and key vias may be minimized, such gaps may be useful for cooling ventilation of the base chassis or for allowing backlighting to frame the haptic keys. Similarly, a touchpad 302 top touch interface layer may be attached under the coversheet 305 to seamlessly provide a designated touchpad area in the C-cover 335 coversheet 305. Any combination of a continuous coversheet for haptic keys and vias in the coversheet for placement of haptic keys of a keyboard coversheet layer 305 are contemplated in various embodiments. Further, it is contemplated that in some embodiments one or the other of a haptic keyboard or haptic touchpad may be used with a keyboard 300 having mechanically actuated keys 301 or a touchpad 302 with a mechanically actuated diving board mechanism. Any combination of the above coversheet 305 layouts described is contemplated in embodiments described herein.

The keyboard stack up 300 may further include a C-cover substructure 335 forming part of the base chassis with a cutout for keyboard 301 and touchpad 302. The C-cover substructure 335 may be made of a rigid material that prevents little or no movement. The rigidity of the C-cover substructure 335 allows the other layers within the keyboard 301 to be maintained within the information handling system. In an embodiment, the C-cover substructure 335 may be made of a metal.

The keyboard stack up 300, in an embodiment, may further include any number of adhesive layers 315. In an embodiment, a first adhesive layer 315 may mechanically couple the coversheet layer 305 to a contact foil layer 310. The first adhesive layer 315 may include the placement of the adhesive at locations that may enhance the movement and prevent the hindrance of the actuation of the coversheet layer 305 at those locations across the coversheet layer 305 where keys are present. In a specific embodiment, the first adhesive layer 315 may include placing the adhesive along borders of each of the keys as well as placing the adhesive at a central location of each of the keys.

The contact foil layer 310 is adhered to the coversheet layer 305 via the first adhesive layer 315 may be made of any elastically resilient material that, when any given key is actuated or the contact foil layer 310 is bent towards a lower portion of the respective key, returns to its original state when the respective key is no longer being actuated. The contact foil layer 310 may include a number of metal traces 345 formed on one or more of its surfaces that electrically and communicatively couples each of the keys and a corresponding piezoelectric element 320 to a keyboard controller 326 of an information handling system that includes a typing profile based mood sensing system such as described in connection with FIG. 1. In an embodiment, the keyboard controller 326 may be a dedicated controller communicatively coupled to the contact foil layer 310 so as to detect electrical charges from each of the piezoelectric elements 320 and provide electrical haptic feedback control signals back to the respective piezoelectric elements 320. In an alternative embodiment, the keyboard controller 326 may be a processor of the information handling system that, among other computations and execution of other computer readable program code, also executes computer readable program code associated with the typing profile based mood sensing system as described in FIG. 1.

During operation of each key on the keyboard 301, the contact foil layer 310 may receive an electrical charge from the respective piezoelectric elements 320 as they are compressed upon actuation at the metal traces 345 that conduct the electrical charge to the controller 325 associated with the keyboard 300. The metal traces 345 formed on the contact foil layer 310 may further be used to conduct a return electrical haptic response signal from the controller 325 to the piezoelectric elements 320 so that the voltage and current of the return electrical haptic feedback control signal may cause the piezoelectric elements 320 to stretch or contract in response to a control haptic feedback signal and at varying polarities, voltages, or currents. This electrical response control signal to of each of the actuated piezoelectric elements 320 may cause a haptic feedback presented at each of the keys that the user may feel. This haptic feedback may be relayed to the user within microseconds of the user actuating any of the keys on the keyboard 301 such that the user physically detects a sensation that the key was pressed. This sensation felt by the user may be present despite no actual mechanical devices such as a scissor mechanism or other types of keyboard mechanical devices being present among the layers of the keyboard 301.

The keyboard stack up 300 may further include a second adhesive layer 316 that mechanically couples the contact foil layer 310 to a support plate 330. In an embodiment, the second adhesive layer 316 may include the placement of an adhesive along borders of each piezoelectric element 320 of the keyboard stack up 300. As shown in FIG. 3, the second adhesive layer 316 includes circular voids that conform to a shape of each piezoelectric element 320 within the keyboard stack up 300.

The support plate 330 may be made of rigid material such as a metal. The support plate 330 prevents deformation of the keyboard stack up 300 except for, in some embodiments, the contact foil layer 310, piezoelectric element 320, first adhesive layer 315, and second adhesive layer 316 as for operation of the haptic keys. As such, the contact foil layer 310 may be allowed to detect the deformation of the piezoelectric elements 320. Additionally, a user using the keyboard 301 may feel a level of rigidity in the keyboard 301 except that at the locations of the keys where the user has expected that some level of deformation occurs when pressure is applied to provide for key actuation of the piezoelectric element 320.

In an embodiment, the support plate 330 may include a number of cavities 331 formed therein. The cavities 331 may be sized to have a relatively smaller diameter than the diameter of each of the respective piezoelectric elements 320. By including these cavities 331, the piezoelectric elements 320 may be allowed to be deformed into the cavities 331 so that the deformation of the piezoelectric element 320 creates the electrical charge described herein. The metal plate of the piezoelectric elements 320 may have a diameter greater than cavities 331. Upon compression or contraction of the piezoelectric material portions, such as a ceramic disk of the piezoelectric element 320, the metal plate may warp into or away from the cavity 331. The depth of the cavities 331 may also be selected to allow for at least a central portion of each piezoelectric element 320 to be deflected into the cavities 331 some distance. This distance of deflection, in an embodiment, may be 0.1 mm or smaller or may be greater. In an embodiment, the cavities 331 may also be holes punched or machined through the support plate 330.

In an embodiment, the support plate 330 may be secured to other rigid elements of the information handling system. In an embodiment, the support plate 330 may be secured to the C-cover substrate 335 via a number of bolts, screws, or other mechanical or chemical coupling device. In some embodiments, the support plate 330 may be operatively coupled to the D-cover of the information handling system.

Each of the piezoelectric elements 320 may include a first portion layer of piezoelectric material and a second portion conductive layer as described herein in connection with the larger figures describing the keys in FIG. 2. Additionally, each piezoelectric element 320 of the keyboard 301 may be operatively coupled to at least one metal trace 345 formed on the contact foil layer 310 via a contact point such as a solder point. The contact foil layer 310 may, in a particular embodiment, include two metal traces 345 for each piezoelectric element 320 at a first portion and a second portion formed in the keyboard 301.

During operation of the keyboard 301, a user may actuate a key formed on the coversheet layer 305 of the keyboard 301 by pressing down on that key. As a result of the mechanical stress placed on the piezoelectric material of the piezoelectric element 320 associated with the actuated key, an electric charge is created at the piezoelectric element 320. The electrical charge is carried to one or more metal traces 345 coupled to the piezoelectric material and the metal plate of the piezoelectric element 320 via a contact point such as a solder point. The electric charge received at the one or more metal traces 345 may be conducted to a controller 325 by the metal trace 345 as described herein.

In an embodiment, the controller 325 may detect that electrical charge produced by the mechanical stress of the piezoelectric material of the piezoelectric element 320 and send an electrical haptic feedback control signal back to the piezoelectric material of the piezoelectric element 320. This electrical haptic feedback control signal may have a certain voltage, current, and polarity (−,+) sufficient to render the piezoelectric material of the piezoelectric element 320 to cause a haptic event, movement, or sound. The electrical haptic feedback control signal from the controller 325 may follow the same or a different metal trace 345 back to the piezoelectric element 320. The electrical haptic feedback control signal may be received at the piezoelectric material and metal plate of the piezoelectric element 320 via, for example, a contact point such as a solder point. Because the piezoelectric material of the piezoelectric element 320 receives the electrical haptic feedback control signal from the controller 325 this causes the piezoelectric material to generate a haptic event.

A response signal may be a sine wave, a square wave, a pulsed signal, or other waveform of changing current, voltage, or polarity applied to the piezoelectric element 320. As a result of the piezoelectric material stretching or contracting during the haptic event, the piezoelectric element 320 warp downward or upward with respect to the cavity 331 and may return back to a non-deformed state, thereby creating haptic feedback felt by the user's finger. In an embodiment, the relay of the electrical charge to the controller 325, the detection of the controller 325 of the electrical charge, and the return of the electrical haptic feedback control signal by the controller 325 to the piezoelectric element 320 may be sufficiently quick enough for the user to feel the haptic feedback in a manner that the user does not detect any temporal delay between the actuation of the key and the detection of the haptic feedback created at the piezoelectric element 320. In an embodiment, the relay of the electrical charge to the controller 325, the detection of the controller 325 of the electrical charge, and the return of the electrical haptic feedback control signal by the controller 325 to the piezoelectric element 320 may be on the order of microseconds. This operation of each of the keys of the keyboard 301 may be conducted every time the user actuates any key on the keyboard 301.

By applying voltage to each of the piezo elements 320 in a piezo haptic keyboard assembly, the controller 325 in an embodiment may control the factors influencing a user's tactile experience, including detecting any application of force applied to a key or touchpad. In some embodiments, the piezo elements 320 and controller 325 may control the amount of force a user must use to depress a key 301 or the touch pad 302 on the cover sheet 305, the speed and force with which each of the keycaps 301 returns to their neutral positions after being depressed, and the sound such an interaction generates, among other factors. In contrast to conventional keyboard assemblies, each of these factors may be adjusted, allowing for a wide range of tactile experiences for users via adjustment of a haptic response control signal to the piezo elements 320.

The controller 325 may receive instructions based on adjustable piezo element settings, and apply those settings to control the ways in which each of the piezo elements 320 in the piezo element layer deflects. For example, the controller 325 may control or set the degree to which a piezo element 320 in the piezo element layer must deform before it registers occurrence of a keystroke or a click of the touch pad 302. The controller 325 in an embodiment may also set the ways in which the piezo elements 320 in the piezo element layer beneath the cover sheet 305 deflect, in order to give the user a haptic experience similar to that of a conventional keyboard, or based on user input. For example, the controller 325 may cause the contact foil layer 310 affixed to each of the plurality of piezo elements 320 in the piezo element layer to apply specific voltages to the plurality of piezo elements 320, on an element-by-element basis. The changes in polarity and level of voltage applied to each piezo element 320 in the piezo element layer may dictate the variation in rigidity or movements of a given piezo element 320, the force with which it warps downward, then upward following deflection, and the sound such a return makes. The controller 325 may similarly apply voltage to each piezo element 320 in the piezo element layer via the contact foil layer 310 to make a single piezo element 320, a preset combination of piezo elements, or each of the piezo elements vibrate, click, bounce, or provide other haptic feedback pursuant to a haptic feedback control signal applied to the piezo element 320 upon detection of a keystroke.

By controlling the movement, rigidity, keystroke sensitivity, return force, vibration, pulsing, click, or other movement of piezo elements 320 in such a way, the controller 325 may control the force threshold required to cause a keystroke to register, the surface area on the cover sheet 305 in which a user may apply that force to cause a keystroke to register, and several aspects of the piezo element 320 haptic response following detection of such a keystroke. Each of these factors may be preset to a default position designed to mimic a conventional keyboard, in an embodiment, and adjusted by a user via a graphical user interface or may be set to provide a unique haptic response. In some embodiments, each of these factors may be set according to a personal typing profile, or a preset user mood classification associated with a current user, as accessed via memory of the information handling system or via a cloud-based memory storage. Further, changes made to any of these factors and applied by the controller 325 may be recorded for use in developing a personal typing profile or a preset user mood classification for a given user.

Figure 4:
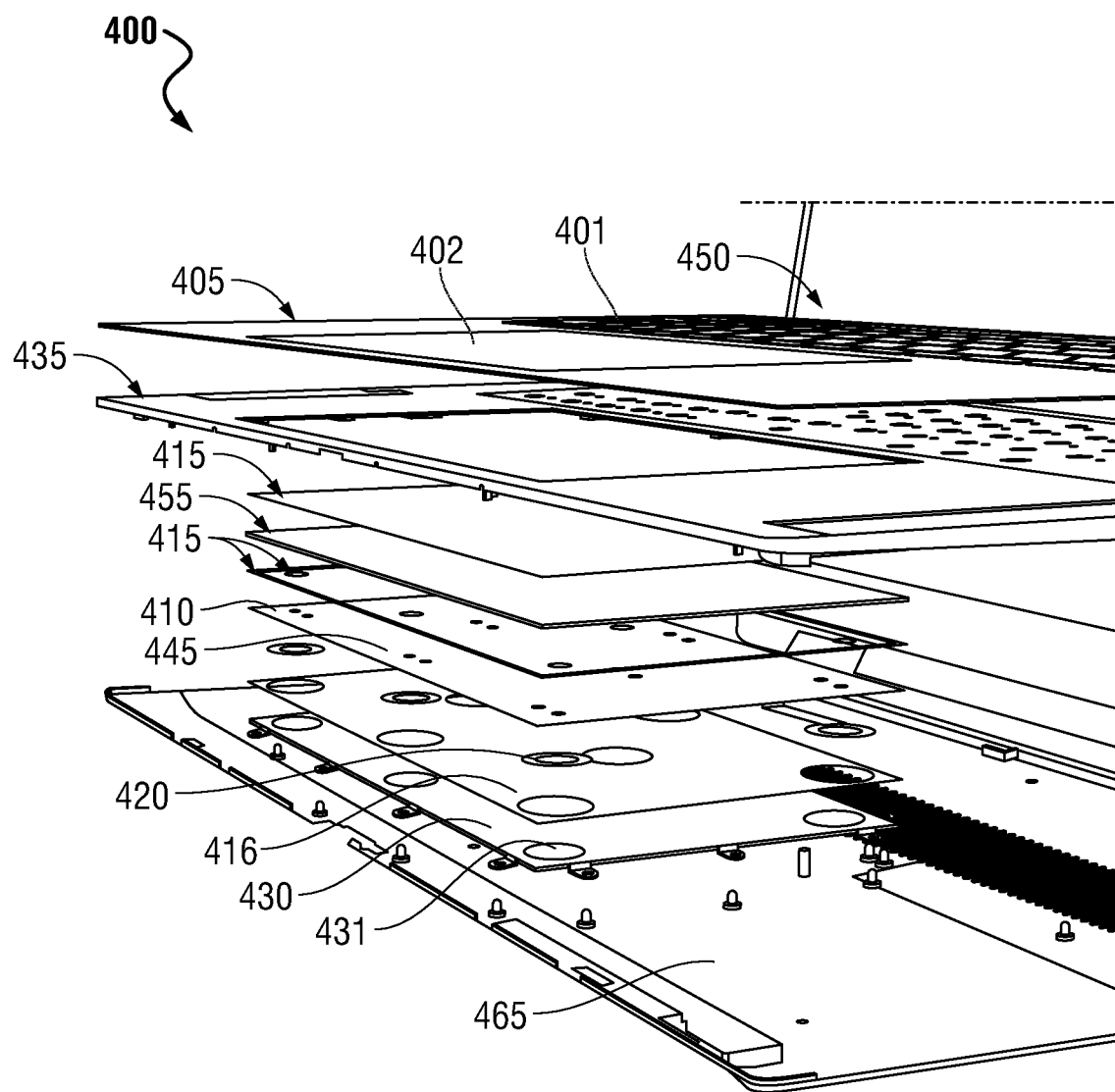
FIG. 4 is an exploded perspective view of a touchpad stack up for an information handling system according to another embodiment of the present disclosure.

FIG. 4 is an exploded perspective view of a touchpad stack up 400 of an information handling system according to another embodiment of the present disclosure. As described herein, the touchpad stack up 400 may also have a touchpad that implements the piezoelectric elements 420 described herein. The touchpad may be formed, in some embodiments, into a touchpad cover area 402 in coversheet layer 405. Coversheet 405 may also have a number of keys of a keyboard 401. Coversheet 405 may have one or both the haptic touchpad 402 and haptic keyboard 401 in some embodiments. In other embodiments, either the haptic touchpad 402 or keyboard 401 may be a conventional system. For example, a mechanical keyboard 401 may be implemented with a haptic touchpad 402. In another embodiment, the touchpad coversheet layer 405 may be separate from any other coversheet layer such as for the keyboard 401 or other portions of a C-cover.

The touchpad coversheet layer 405 with designated haptic touchpad country 402 may be made of any type of elastically resilient material. The elastically resilient material may allow, at least, a portion of the touchpad coversheet layer 405 to be deformed upon application of a pressure from a user's finger. Upon withdraw of the pressure from the user's finger, the material of the touchpad coversheet layer 405 is made of allows the touchpad coversheet layer 405 of the touchpad to bend back to its pre-deformed state. In an embodiment, the resilient material may allow the touchpad coversheet layer 405 at haptic touchpad 402 to travel a distance of between 0.01 mm and 2 mm.

The arrangement of the piezoelectric elements 420 for haptic touchpad 402 described herein is also shown in FIG. 4. In the embodiment shown in FIG. 4, piezoelectric elements 420 are placed in an array under the touchpad of the touchpad coversheet layer 405. The placement of the piezoelectric elements 420 in the array under the touchpad surface 402 of the touchpad coversheet layer 405 may include more or less than the number of piezoelectric elements 420 shown. As described herein, the operation of the touchpad may be dependent on the location and number of piezoelectric elements 420. During operation, a touchpad controller (not shown) similar to the controller described in connection with FIG. 3 may receive an electric charge from one or a plurality of piezoelectric elements 420 formed below and across the touchpad area 420 of coversheet layer 405 so that the controller may detect one or more piezoelectric elements 420 providing a signal depending on proximity underneath an x- and y-coordinate location of the actuation location on the touchpad by the user. The receipt of one or a plurality of electrical charges from these piezoelectric elements 420 may allow the controller to appropriately send a return electrical haptic feedback control signal to any of the piezoelectric elements 420 so that the user may detect a haptic feedback at the location where the user has actuated the haptic touchpad 402 of the coversheet layer 405.

The coversheet 405 with haptic touchpad 402 may further include a C-cover substructure 435. The C-cover substructure 435 may be made of a rigid material that prevents little or no movement. The rigidity of the C-cover substructure 435 allows the other layers within the touchpad stack up 400 to be maintained within the information handling system. In an embodiment, the C-cover substructure 435 may be made to a metal.

The touchpad stack up 400, in an embodiment, may further include any number of adhesive layers 415. In an embodiment, a first adhesive layer 415 may mechanically couple the touchpad coversheet layer 405 to a capacitive touch layer 455. The capacitive touch layer 455 may be made of a rigid material such as a glass, biaxially-oriented polyethylene terephthalate (BoPET) such as Mylar® produced by DUPONT®, or a glass-reinforced epoxy such as FR4 to serve a purpose as a stiffening layer as well. The capacitive touch layer 455 includes a grid of drive and sense lines to determine x- and y-touch locations on haptic touchpad 402 by a user. The capacitive touch layer 455 may be placed within the layers of the touchpad to distribute forces from a user's finger across the surface of the touchpad coversheet layer 405 and to the nearest or a plurality of nearest piezoelectric elements 420 in the array formed below and across the bottom surface of the haptic touchpad 402 of the coversheet layer 405 and capacitive touch layer 455. The stiffening function of the capacitive touch stiffening layer 455 is an optional embodiment as a rigidity of the haptic touchpad 402 may be provided by other layers as well in other embodiments.

The first adhesive layer 415 may be include the placement of the adhesive at locations that may enhance the movement and prevent the hinderance of the actuation of the touchpad coversheet layer 405 at those locations across the touchpad coversheet layer 405 where piezoelectric elements 420 are present. In a specific embodiment, the first adhesive layer 415 may include placing the adhesive along borders of each of the piezoelectric elements 420 as well as placing the adhesive at a central location of each of the piezoelectric elements 420.

The contact foil layer 410 adhered to the touchpad coversheet layer 405 via the first adhesive layer 415 may be made of any elastically resilient material that, when any given location at the touchpad coversheet layer 405 is actuated or the contact foil layer 410 is bent towards a lower portion of the respective location, returns to its original state when the respective location is no longer being actuated.

In an embodiment, the contact foil layer 410 or the capacitive touch layer 455 may include a capacitive touch layer x and y grid that detects and measures anything that is conductive such as a user's finger. The drive lines and sense lines may be a grid of indium tin oxide (ITO) or other conductive materials arranged to detect capacitive changes at x and y locations across the capacitive touch layer that correspond to the touch interface cover layer of the haptic touchpad 402. The capacitive touch layer 455 may be a printed circuit board (PCB) layer for the detection of the user's finger at an x- and y-coordinate location across the surface of the area of the haptic touchpad 402 of the coversheet layer 405. The capacitive touch layer 455 may be an array of drive lines and sense lines of ITO formed on the capacitive touch stiffening layer 455 or on the contact foil 410 in an embodiment. Drive lines and sense lines may be operatively coupled to a capacitive touch controller for determining x- and y-location of touches on the haptic touchpad 402. The capacitive touch layer can be part of the contact foil layer 410, or the its own contact touch layer 455, or part of a stiffener layer in various embodiments.

The contact foil layer 410 may include a number of metal traces 445 formed thereon that electrically and communicatively couples each of the locations and corresponding piezoelectric elements 420 to a haptic keyboard controller (not shown) of an information handling system that includes a haptic feedback touchpad control system 132 such as described in connection with FIG. 1. Traces may be opposite the capacitive touch layer on contact foil layer 410 in an embodiment. In an embodiment, the controller may be a dedicated controller communicatively coupled to the contact foil layer 410 so as to detect electrical charges from the piezoelectric elements 420 and provide electrical haptic feedback control signals back to the respective piezoelectric elements 420. In an alternative embodiment, the controller may be a processor of the information handling system that, among other computations and execution of other computer readable program code, also executes computer readable program code associated with the haptic feedback keyboard control system 132 as described in FIG. 1.

During operation of the touchpad, the contact foil layer 410 may receive an electrical charge from one or a plurality of piezoelectric elements 420 operatively coupled underneath the metal traces 445 that conduct the electrical charge to the controller associated with the keyboard 400. The metal traces 445 formed on the contact foil layer 410 may further be used to conduct a return electrical haptic feedback control signal from the controller to the piezoelectric elements 420 so that the voltage and current of the return electrical haptic feedback control signal may cause the piezoelectric elements 420 to return to a haptic feedback event to the touchpad area 402. This haptic feedback event of the actuated piezoelectric elements 420 may cause a haptic feedback presented at the actuation location along the touchpad coversheet layer 405 that the user may feel. As described, the response electrical haptic feedback control signal may be a sine wave, a square wave, a pulsed signal or other variations of voltage or polarity changes to generate a warping of a metal plate for the haptic feedback event. This haptic feedback may be relayed to the user within microseconds of the user actuating a location on the touchpad area 402 of the coversheet layer 405 such that the user physically detects a sensation that the touchpad coversheet layer 405 was pressed. This sensation felt by the user may be present, despite no actual mechanical devices, such as a click switch mechanism, a touchpad trigger, or other types of touchpad mechanical devices being present among the layers of the touchpad stack up 400. The haptic event in particular may feel like a click similar to a mechanical switch click upon a press for selection by a user.

The touchpad stack up 400 may further include a second adhesive layer 416 that mechanically couples the contact foil layer 410 to a support plate 430. In an embodiment, the second adhesive layer 416 may include an adhesive that includes the placement of an adhesive along borders of each piezoelectric element 420. As shown in FIG. 4, the second adhesive layer 416 includes circular voids that conform to a shape of each piezoelectric element 420 placed below the touchpad area 402 of the coversheet layer 405.

The support plate 430 may be made of rigid material such as a metal. The support plate 430 prevents deformation of the touchpad stack up 400 except for, in some embodiments, actuation levels of deformation at the contact foil layer 410, piezoelectric elements 420, the first adhesive layer 415, second adhesive layer 416, and other relevant layers as described. As such, the contact foil layer 410 may be allowed to detect the deformation of the piezoelectric elements 420. Additionally, a user using the touchpad stack up 400 may feel a level of rigidity in the area of the haptic touchpad 402 that the user actuates with the piezoelectric elements 420 providing a haptic event to mimic the deformation to occur when pressure is applied.

In an embodiment, the support plate 430 may include a number of cavities 431 formed therein. The cavities 431 may be sized to have a relatively smaller diameter than the diameter of each of the respective piezoelectric elements 420. By including these cavities 431, the piezoelectric elements 420 may be allowed to be deformed into the cavities 431 so that the deformation of the piezoelectric elements 420 creates the electrical charge described herein to detect actuation. The depth of the cavities 431 may also be selected to allow for at least a central portion of each piezoelectric elements 420 to be deflected into the cavities 431 some distance. This distance of deflection, in an embodiment, may be 0.1 mm or smaller or greater according to embodiments herein.

In an embodiment, the support plate 430 may be secured to other rigid elements of the information handling system. In an embodiment, the support plate 430 may be secured to the C-cover substructure 435 via a number of bolts, screws, or other mechanical or chemical coupling device. In some embodiments, the support plate 430 may be a part of the D-cover of the information handling system.

Each of the piezoelectric elements 420 may include a layer of piezoelectric material and a conductive metal plate layer as described herein in connection with the larger figures describing the keys in FIG. 2. Additionally, each piezoelectric element 420 of the touchpad stack up 400 may be operatively coupled to at least one metal trace 445 formed on the contact foil layer 410 via a contact point such as a solder point. In this embodiment, the conductive metal plate and the piezoelectric materials of the piezoelectric elements 420 may each be operatively coupled to at least one metal trace 445 formed on the contact foil layer 410 via a contact point such as a solder point. Thus, the contact foil layer 410 may, in an embodiment, include two metal traces 445 for each piezoelectric element 420 formed in the keyboard 400.

During operation of the touchpad of the keyboard 400, a user may actuate a location across the touchpad area 402 of the coversheet layer 405 by pressing down on that location of the touchpad coversheet layer 405. As a result of the mechanical stress placed on the location of the touchpad area 402 of the coversheet layer 405, one or more piezoelectric materials of the piezoelectric elements 420 associated with a location or neighboring locations of the actuation location may be compressed. This compression of the piezoelectric element 420 may create an electric charge indicating actuation. The electrical charge is carried to one or more metal traces 445 coupled to the piezoelectric elements 420 via contact points such as solder points. The electric charge received at the metal trace 445 may be conducted to a controller (not shown) by the metal traces 445 as described herein. In this embodiment, the controller may detect that electrical charge produced by the mechanical stress of the piezoelectric material of the piezoelectric element 420 and send an electrical haptic feedback control signal back to the piezoelectric material of the piezoelectric element 420. This electrical response signal may have a certain voltage, current, and polarity sufficient to cause a stretching or contraction response to generate a haptic feedback event as described in various embodiments herein. The electrical haptic feedback control signal from the controller may follow the same metal traces 445 back to the given piezoelectric element 420. The electrical haptic feedback control signal may be received at a conductive layer of the piezoelectric element 420 via, for example, the contact points such as the solder points. As a result of the piezoelectric material may be made rigid and the piezoelectric element 420 may return back to a non-deformed state thereby creating haptic feedback felt by the user's finger. This haptic feedback effect may be a click mimicking a mechanical click switch. In an embodiment, the relay of the electrical charge to the controller, the detection of the controller of the electrical charge, and the return of the electrical haptic feedback control signal by the controller to the piezoelectric element 420 may be sufficiently quick enough for the user to feel the haptic feedback in a manner that the user does not detect any temporal delay between the actuation touchpad coversheet layer 405 and the detection of the haptic feedback created at the or a plurality of piezoelectric elements 420. In an embodiment, the relay of the electrical charge to the controller, the detection of the controller of the electrical charge, and the return of the electrical haptic feedback control signal by the controller to the piezoelectric element 420 may be on the order of microseconds.

The individual piezoelectric elements 420 may cooperate within the array to create the haptic feedback felt by the user at the touchpad coversheet layer 405. In some specific embodiments, the location of actuation by the user may be detected by the capacitive touch layer (either integrated into the contact foil layer 410, a separate capacitive touch layer 455, or with a stiffening layer) to indicate to the controller which piezoelectric elements 420 should receive a return electrical haptic feedback control signal. Along with the receipt of an electrical charge from the piezoelectric elements 420, the controller may cause that all or a portion of the touchpad area forming the coversheet layer 405 receive haptic feedback. This may allow the haptic feedback to be felt by the user across the entire surface of the touchpad area 402 of the coversheet layer 405, across a left side of the touchpad area 402 of the coversheet layer 405, across a right side of the touchpad area 402 of the coversheet layer 405, across a top portion of the touchpad area 402 of the coversheet layer 405, across a bottom portion of the touchpad area 402 of the coversheet layer 405, or any specific area across the surface of the touchpad area 402 of the coversheet layer 405. In some embodiments, only a piezoelectric element 420 directly under the touch location or only piezoelectric elements 420 next to the nearest piezoelectric element 420 under the touch location may provide a haptic feedback event. Along with the capacitive touch layer, the piezoelectric elements 420 may allow a user to have the user's touch be detected at the touchpad while actuation, at any location across the surface of the touchpad coversheet layer 405 provides haptic feedback to the user so that the user can engage in a "click" action at the touchpad such as when selecting an item on a graphical user interface.

In an embodiment, the keyboard 400 may, once the layers described herein are coupled together, may be placed within the C-cover 435 with a D-cover 465 coupled thereto. The assembly of the coversheet 405, C-cover substructure 435, and the D-cover 465 forms a base chassis of the information handling system. In an embodiment, the base chassis may be coupled to a display chassis 450 that may include a display device. The touchpad stack up 400 described herein may allow the user to provide input to the display device of the display chassis using the capacitive touch layer, the piezoelectric elements 420 determining actuation, and the haptic feedback capabilities associated with the piezoelectric elements 420. By way of example, the capacitive touch layer may allow a user to move a cursor across the screen. In these examples, actuation of the touchpad coversheet layer 405 at a location across the touchpad coversheet layer 405 causes an item to be selected that is represented on the display device. This "click" action may provide similar input to the processor of the information handling system similar to that of a mouse click.

Figure 5:
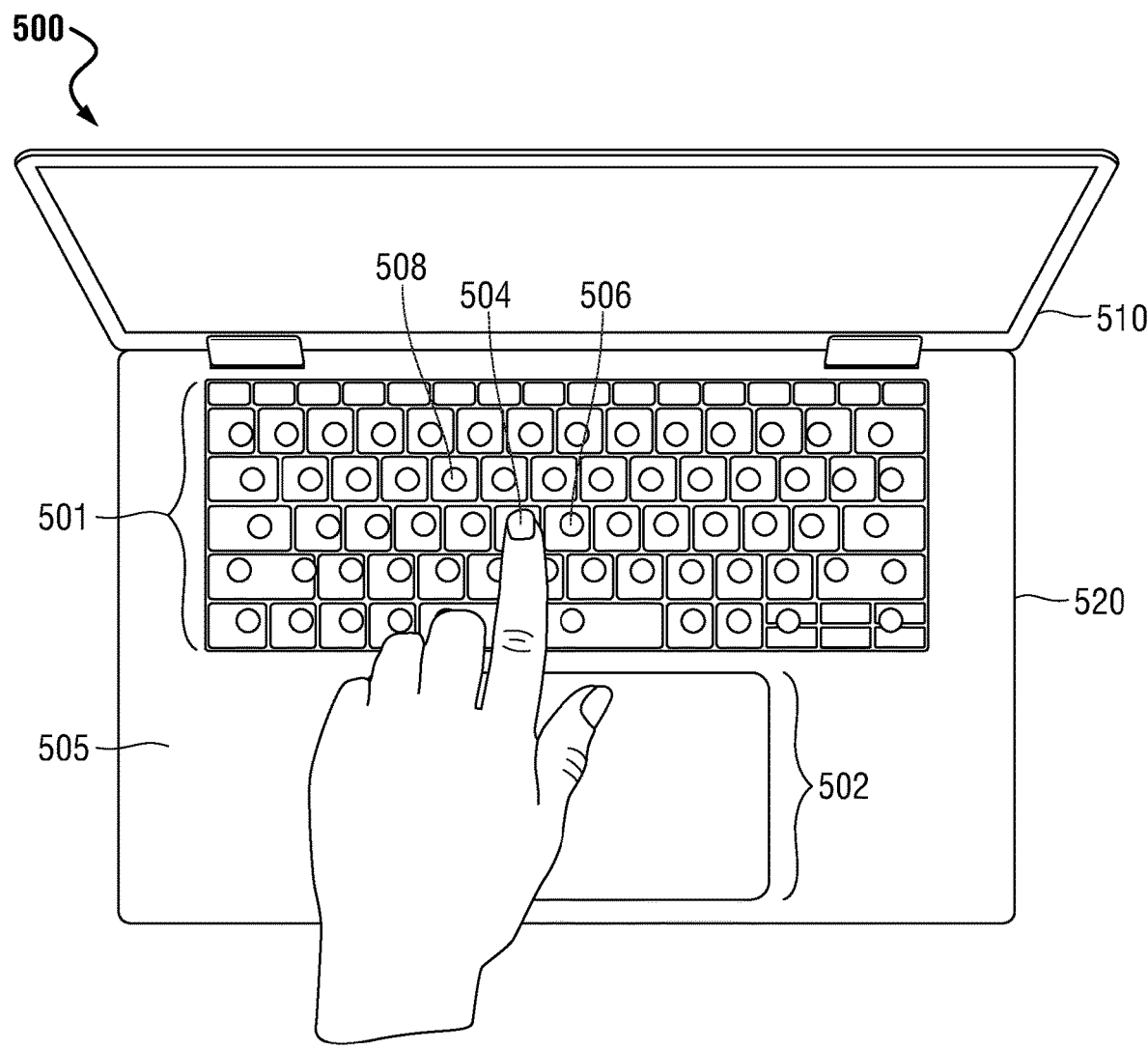
FIG. 5 is a graphical diagram illustrating a piezo haptic keyboard and haptic touchpad in an information handling system according to an embodiment of the present disclosure.

FIG. 5 is a graphical diagram illustrating deformation of a plurality of piezo elements situated within a set area of force detection pursuant to downward force applied by a user according to an embodiment of the present disclosure. FIG. 5 shows an information handling system 500 implementing a haptic keyboard area 501 and a haptic touchpad area 502 of a coversheet for a base chassis 520 of the information handling system according to embodiments herein. Information handling system 500 includes the base chassis 520 which may house the haptic keyboard 501 and the haptic touchpad 502 including the stack up layers of each as described in embodiments herein. Further, the C-cover of the base chassis 520 may include the coversheet 505 that operates to provide user interface locations for keys of haptic keyboard 501 and for a touchpad interface area for haptic touchpad 502. The base chassis 520 may further house components of the information handling system including processor, graphics processor, motherboard, graphics board, bus systems, power and battery systems, wireless systems, thermal controls, data and power ports, and other components in accordance with the description of FIG. 1. Those components may be installed according to techniques understood by those of skill. Further, base chassis 520 may be hinged to a display chassis for housing a display device and other components according to embodiments herein.

As described herein, a separate piezo element may be situated directly beneath each key cap within the cover sheet in some embodiments. In other embodiments, a plurality of piezo elements may be distributed horizontally across a layer disposed beneath the cover sheet, but the placement of each of the plurality of piezo elements may not directly correspond to the location of individual keys within the cover sheet. For example, in some embodiments, a single piezo element may be situated directly beneath a point 504 on the cover sheet at which the user applies a downward force. In one such embodiment, only a single piezo element (not shown) situated directly beneath the point 504 may deform, causing the controller to register a keystroke. In another such embodiment, the downward force applied at point 504 may cause some deflection of piezo elements 506 or 508, situated nearby the point 504, but not directly beneath it.

In other embodiments, the point 504 on the cover sheet at which the user applies downward force may not be situated directly above a single piezo element. In such an embodiment, the downward force applied at point 504 may cause full or partial deflection of one or more of the nearby piezo elements 506 or 508. Determination of the degree to which each of the piezo elements 506 and 508 deflect in such embodiments may be used to triangulate the center of the downward force applied at point 504. Because some of these piezo elements may be situated beneath the base chassis top cover, where a user may rest her palms while typing, the degree to which each of these piezo elements deflect may indicate placement of a user's palms upon the base chassis top cover at a given point in time in some embodiments.

Figure 6:
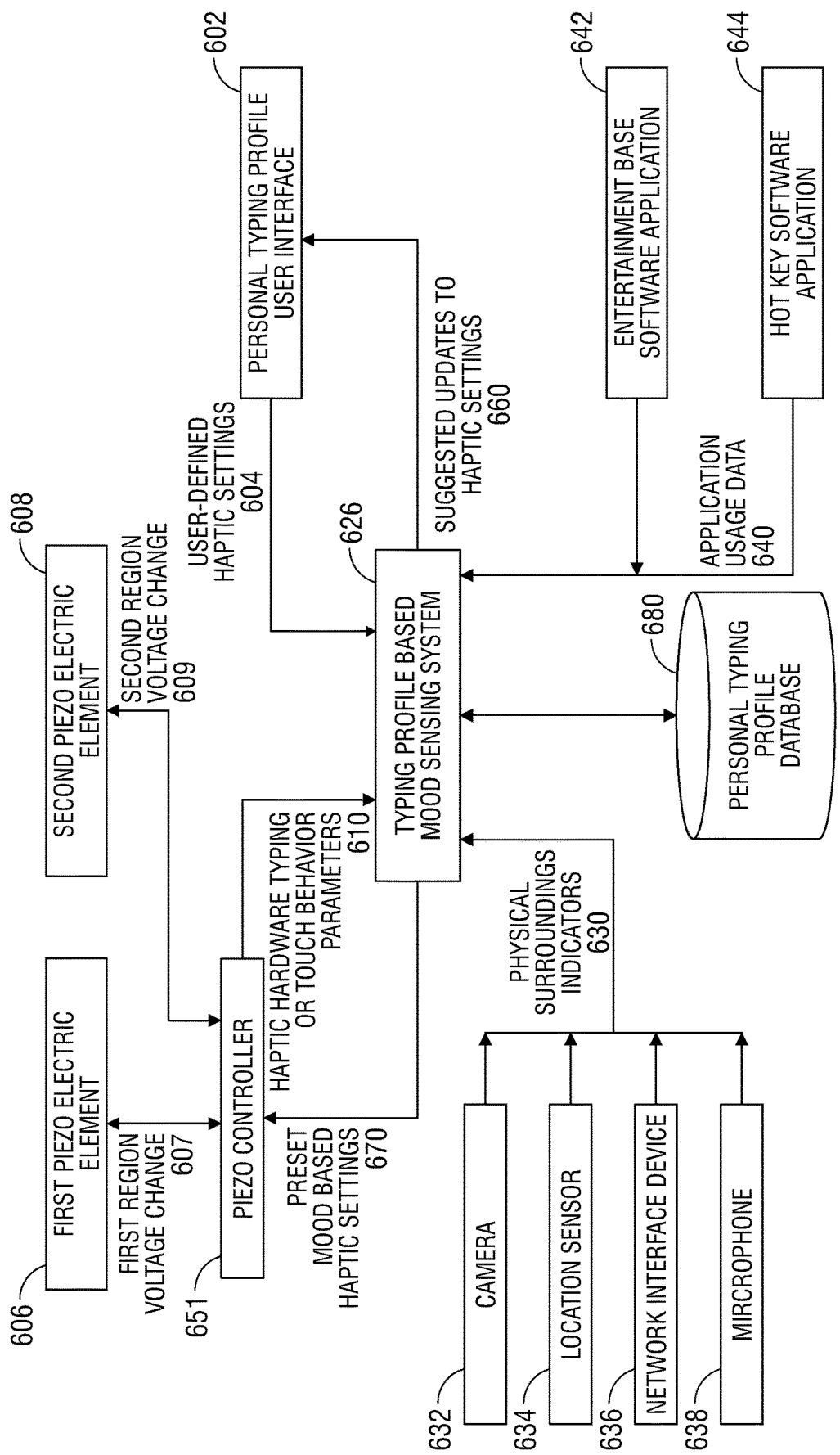
FIG. 6 is a block diagram illustrating a typing profile based mood sensing system that senses preset user mood based on a specific user's personal typing profile according to an embodiment of the present disclosure.

FIG. 6 is a block diagram illustrating a typing profile based mood sensing system that senses user mood classification based on a specific user's personal typing profile and optimizes piezo haptic keyboard settings, piezo haptic touchpad settings, or other information handling system operations based on the detected mood according to an embodiment of the present disclosure. Such a personal typing profile or touchpad usage profile in an embodiment may be made based on monitored haptic hardware user typing or touch behavior. In some embodiments, the personal typing profile may also take into account recorded user-defined haptic settings, physical surroundings indicators, and application usage data, for example. The typing profile based mood sensing system 626 in an embodiment may communicate with a piezo controller 651, a personal typing profile user interface 602, one or more software applications, and a plurality of environmental sensors to develop and apply a personal typing profile for a given user. For example, the typing profile based mood sensing system 626 in an embodiment may develop a personal typing profile including values for a plurality of haptic hardware typing or touch behavior parameters 610 that can be used to identify a baseline mood for a known, individual user. The typing profile based mood sensing system 626 in an embodiment may then compare later measured values for the same haptic hardware typing or touch behavior parameters 610, user-defined haptic settings 604, physical surroundings indicators 630, or application usage data 640 to determine changes in user typing behavior, and associate those changes with a known user mood. To account for such a known user mood (e.g., stressed or fatigued), the typing profile based mood sensing system 626 in an embodiment may then alter the haptic keyboard settings (e.g., increase vibration intensity, duration, or sharpness if user is fatigued) by transmitting updated haptic settings 670 to the piezo controller 651 and modify the settings of the haptic keyboard and touchpad control system function. In other embodiments, the detected mood classification by the typing profile based mood sensing system 626 may alter information handling system function such as display lighting levels, sound volumes, software update initiation, error correction measures, or similar changes to the operation of the information handling system or operating software applications operating thereon upon determination of the mood classification.

The typing profile based mood sensing system 626 in an embodiment may develop a personal typing profile for a given user during an initial setup period in which the user is relaxed, and generally calm, in order to establish a personal typing profile for a baseline mood. This personal typing profile may provide the baseline against which future metrics may be compared to detect a user's mood changes. In some embodiments, several personal typing profile baselines may apply to a user depending on the environment, applications operating, or time of day. For example, baselines may be set depending on time of day (e.g., evening versus daytime), the location of information handling system (e.g., office versus home), ambient noise levels (e.g., crowded area or current teleconference versus quiet area), light levels detected around the information handling system (e.g., brightly lit active environment versus darkened or dim quiet environment), or the types of applications (e.g., work-related versus entertainment) currently being executed on the information handling system. The piezo controller 651 in an embodiment may transmit haptic hardware typing or touch behavior parameters 610 to the typing profile based mood sensing system 626, including metrics describing how a user interacts with the keyboard and touchpad. As described herein, the controller 651 may be operably attached to a contact foil layer affixed to a plurality of piezo elements, such as 606 and 608. The plurality of piezo elements in an embodiment may deflect upon downward pressure applied by the user to the keyboard or the touch pad in an embodiment. For example, a first piezo electric element 606 may be situated beneath a first region of a cover sheet, such as beneath a first key within the keyboard, and a second piezo electric element 608 may be situated beneath a second region of the cover sheet, such as beneath a second key within the keyboard. In an alternative embodiment, the piezoelectric elements 606 and 608 may be beneath a touchpad interface area of a coversheet. As a user applies a downward force in the first region (e.g., on the first key) in such an embodiment, the first piezo element 606 may deflect, applying an electrical current to the traces of the contact foil layer, and generate a voltage change 607 across the contact foil layer. The controller 651 may be operably connected to the contact foil layer and capable of associating the voltage change 607 with an indication that a keystroke or touch event above the first piezo electric element 606 has occurred. Similarly, as the user applies a downward force on the second region (e.g., on the second key) in such an embodiment, the second piezo element 608 may deflect, and generate a voltage change 609 across the contact foil layer, causing the controller to determine that a keystroke or touch event above the second piezo electric element 608 has occurred.

In other embodiments, the first piezo element 606 or second piezo element 608 may each be situated partially beneath a plurality of keys on the keyboard, or partially or fully beneath the touch pad. In still other embodiments, one of the first piezo element 606 or the second piezo element 608 may be situated beneath the base chassis top cover where a user may rest her palms while typing. The voltage changes 607 and 609 in embodiments may further indicate the degree to which the piezo elements 606 and 608 deflected, indicating the force with which the user depressed the key or the touchpad situated atop the piezo elements 606 and 608, or the location of the user's palms on the base chassis top cover while typing. Further, by monitoring such voltage changes (e.g., 607 and 609) for each of the plurality of piezo elements within the piezo element layer in an embodiment, and aggregating such notifications over time, the piezo controller 651 may identify the locations of keystrokes and clicks for given keys or the touch pad (e.g., roughly within the center of the key or touch pad, or corner strikes), placement of a user's palms with respect to the keyboard, an average duration of keystrokes or touch pad clicks, force of keystrokes, pauses or intervals in typing, and an overall typing speed. Detection of downward pressure at multiple piezo elements may be used in some embodiments to triangulate a strike location. This may occur in embodiments where a plurality of piezo elements are situated beneath the touch pad, or where the piezo elements are not situated directly beneath a single key of the keyboard. For example, the piezo controller 651 in such an embodiment may compare voltage changes (each indicating a different degree of deflection) across two piezo elements situated nearby one another to determine the center of the keystroke, or the point at which the downward deflection of the coversheet is greatest. The piezo controller 651 or the typing profile based mood sensing system 626 in an embodiment may also monitor, record, or recognize combinations in these parameters 610 that tend to coincide in occurrence. The combinations in these parameters 610 may exhibit repeated patterns for a user that may be detected, for example, in measured haptic hardware typing and touch parameters 610 received from the controller 651. For example, the haptic hardware typing or touch behavior parameters 610 in an embodiment may indicate a given user often presses the backspace key following a corner strike of a particular key or of multiple keys.

Changes in one or more of these metrics in an embodiment may indicate a change in users, a change in user mood, or a change in user-desired haptic response. For example, greater force in keystrokes or increased typing speed may indicate a higher level of stress. These metrics may then be transmitted to the typing profile based mood sensing system 626 as haptic hardware typing or touch behavior parameters 610 in an embodiment. These are only a few examples of behavior parameters that may be monitored and communicated to the typing profile based mood sensing system 626 in an embodiment. Other embodiments contemplate any monitored metrics regarding keyboard or touchpad usage, including overall typing speed, magnitude of downward force applied to each key while typing, and duration of keystrokes.

The typing profile based mood sensing system in an embodiment may apply machine learning methods to detect patterns in these haptic hardware typing or touch behavior parameters 610 for a known, individual user in a calm mood, in order to develop a baseline personal typing profile for that individual user. Such a personal typing profile in an embodiment may describe aspects of that individual user's typing behavior that may be used to detect known moods for that individual user.

Upon receiving the haptic hardware typing or touch behavior parameters 610, the typing profile based mood sensing system 626 may use a typing profile machine learning module 627 to identify patterns in haptic hardware typing or touch behavior parameters 610, or in a combination of parameters 610. The typing profile machine learning module 627 in an embodiment may detect such patterns in an embodiment based on any machine learning or neural network methodology known in the art or developed in the future. For example, the typing profile machine learning module 627 in an embodiment may model the relationships between each of the haptic hardware typing or touch behavior parameters 610 using a layered neural network topology. Such a neural network in an embodiment may include a plurality of layers, where each layer includes a plurality of nodes representing metric values or states for each of the parameters 610. An input layer to the neural network, for example, may include a known, recorded set of values for each of these parameters 610. An output layer to the neural network may include values for a subset of these parameters 610 that are likely to be unique to the individual user when in a calm, baseline mood.

The typing profile machine learning module 627 in an embodiment may attempt to determine the degree to which each of these parameters 610 can be used to identify an individual user in a baseline mood by assigning preliminary weight matrices to each of the nodes in a given layer. Each assigned weight value in the matrix may describe a likelihood that one of these parameters 610 uniquely describes the behaviors of a specific, known, individual user in a baseline mood. The neural network may be modeled using any number of layers, and the nodes in each additional layer may be determined based on the value of the nodes in the previous layer and the weight matrices describing likelihood of the parameters 610 may uniquely define an individual user in a baseline mood. In other words, each new layer in the neural network may include a plurality of nodes representing a best guess of how each of these parameters 610 may uniquely identify an individual user in a baseline mood. A greater number of layers within the neural network topology may decrease the likelihood of divergence (yielding unusable results), but may increase processing time. The neural network may then produce an output layer including a plurality of nodes, each representing a value for a haptic hardware typing or touch behavior parameter 610 that is projected to accurately identify an individual user in a baseline mood. The process of generating an output layer, based on a known set of input layer values may be described herein as forward propagation. An initial forward propagation in an embodiment may project a pattern of haptic hardware typing or touch behavior parameters 610 values recorded over a short period of time, that the typing profile machine learning module 627 identifies as likely to identify an individual user in a baseline mood.

The typing profile personalization system 626 in an embodiment may compare the values in the output layer generated in such an initial forward propagation with haptic hardware typing or touch behavior parameters 610 recorded during a later period of time. In such a way, the typing profile based mood sensing system 626 may compare its projected pattern of haptic hardware typing or touch behavior parameters 610 unique to the individual user with freshly gathered haptic hardware typing or touch behavior parameters 610 also describing the typing behavior of the same individual user, still in a calm, baseline mood. The typing profile machine learning module 627 may then determine a degree of error associated with each projected value (e.g., associated with each node in the output layer of the neural network). In other words, the typing profile machine learning module 627 in an embodiment may compare its projected pattern describing the behavior of the individual user to more current measurements of the ways in which the same authorized user interacts with the keyboard and touchpad. In such a way, the typing profile machine learning module 627 may gauge the degree to which its projected pattern matches the actual behavior of the individual user while in a calm, baseline mood. The typing profile machine learning module 627 may then use these known error margins to adjust the weight matrices associated with each layer of the modeled neural network. For example, the typing profile machine learning module 627 may perform a back-propagation method to adjust each of the weight matrices in order to more accurately reflect the likelihood that each of the values of the haptic hardware typing or touch behavior parameters 610 uniquely describes the individual user in a calm, baseline mood.

The typing profile machine learning module 627 in an embodiment may perform this forward propagation and backward propagation, using different input node values repeatedly to finely tune the weight matrices. For example, the typing profile machine learning module 627 may perform this forward propagation and backward propagation repeatedly during a training session or initial setup period to learn patterns in one or more of these haptic hardware typing or touch behavior parameters 610 that may be uniquely attributable to the known, individual user in a calm, baseline mood. The typing profile machine learning module 627 in an embodiment may perform such forward and backward propagation in an embodiment until the difference between the output layer values in the most recent iteration and the current iteration fall within a preset threshold percentage of one another. For example, if the average value of each output node in the most recent iteration only differs by a threshold percentage value (e.g., one percent, one-half percent, or five percent) from the value of the same output node in the current iteration, it may be determined the pattern described by the output layer is sufficiently accurate to uniquely identify the individual user. In such a scenario, the typing profile machine learning module 627 in an embodiment may end the training session, and store the output layer node values for the current iteration in the personal typing profile 680. The stored output layer node values in the personal typing profile 680 may then be associated with the individual user.

The typing profile based mood sensing system 626 in an embodiment may then compare later measured values for the same haptic hardware typing or touch behavior parameters 610 to determine changes in user typing behavior, and associate those changes with a known user mood. For example, the typing profile based mood sensing system 626 may receive updated haptic hardware typing or touch behavior parameters 610 during a period of time in which the user's mood is unknown, in contrast to the training session in which the user is in a known, calm, baseline mood. If one or more of the values for these haptic hardware typing or touch behavior parameters 610 differ markedly or by a magnitude that is greater than a threshold comparison value, the typing profile based mood sensing system 626 may determine a change in mood has occurred.

Specific values for determined changes in values for one or more haptic hardware typing or touch behavior parameters 610 may be associated in memory with preset user mood classifications. For example, increased force of each keystroke, or overall typing speed, beyond a threshold value may be associated in memory with a stressed mood. As another example, increasingly erratic keystroke locations may be associated in memory with a fatigued mood. As yet another example, an increase in duration of keystrokes beyond a threshold value may be associated in memory with a relaxed mood. In other embodiments, the typing profile based mood sensing system 626 may determine a change in a user's mood based on a combination of changes detected among a plurality of haptic hardware typing or touch behavior parameters. For example, a combination of increasingly erratic keystroke locations and a decrease in overall typing speed beyond a threshold value may be associated in memory with fatigue. These are only a few examples of user mood classifications, and other user moods are also contemplated.

In some embodiments, the typing profile based mood sensing system 626 may determine a user's mood based on a combination of determined changes in haptic hardware typing or touch behavior parameters and observed measurements of user-defined haptic settings 604, physical surroundings indicators 630, or application usage data 640. For example, in such an embodiment, the typing profile based mood sensing system 626 may detect a change in haptic hardware typing or touch behavior parameters sufficient to indicate a potential mood change, receive measurements of one or more of the user-defined haptic settings 604, physical surroundings indicators 630, or application usage data 640, and confirm the potential mood change determination is correct or incorrect based on one or more of these received measurements.

The typing profile based mood sensing system 626 in an embodiment may receive user-defined haptic settings 604 from the personal typing profile user interface 602. As described herein, by receiving voltage or applying a varying voltage of a haptic control signal to each of the piezo elements in a piezo haptic keyboard assembly, a controller may control several factors influencing a user's tactile experience, including the force she must use to depress a key, the speed and force with which each of the keycaps provides a haptic response signal and then returns to its neutral position after being depressed, and the sound such an interaction generates, among other aspects. A user may adjust each of these factors, for example, using the personal typing profile user interface 602 in an embodiment according to their personal preferences. For example, a user may adjust the force threshold required for the controller to register that a keystroke has occurred, and the size of the area in which the user must apply such a force in order for the controller to register a keystroke, for example as a sensitivity level and with neighboring piezo elements detecting location of a keystroke on a key. As another example, a user may adjust the intensity, duration, and sharpness at which a piezo element vibrates or provides other haptic sensory feedback following registering a keystroke, and the burst count and interval of sustained vibrations occurring in response to use of specific applications. As the user adjusts one or more of these settings in an embodiment, the personal typing profile user interface 602 may transmit these user-defined haptic settings 604 to the typing profile based mood sensing system 626 to indicate a user's preferences at a given time. In an embodiment in which the user does not adjust any of these settings, the user-defined haptic settings 604 may be represented by a factory default value for each of these settings. These are only a few examples of user-defined haptic settings 604 that may be received by the typing profile based mood sensing system 626 in an embodiment. Other embodiments contemplate any adjustable settings for a piezo haptic keyboard or touchpad assembly.

The typing profile based mood sensing system 626 in an embodiment may also receive physical surroundings indicators 630 from one or more environmental sensors. For example, physical surroundings indicators 630 in an embodiment may include images, videos, or ambient light measurements captured by a camera 632. Images captured by the camera 632 in an embodiment may be used by the camera 632, an image processing application, or by the typing profile based mood sensing system 626 for facial recognition, measurement of biometrics (e.g., infrared temperature measurement), or object recognition (e.g., detecting whether the user is in a crowded area). The physical surroundings indicators 630 in an embodiment may include such biometric measurements, object recognition determinations, or facial recognition determinations. Such camera-based physical surroundings indicators 630 in an embodiment may describe a user's ambient surroundings, such as whether the user is in a crowded or secluded environment, whether the user is working in a darkened room or outside during the day, or whether the user's biometric measurements indicate the user is stressed, fatigued, or relaxed, for example.

The physical surroundings indicators 630 in an embodiment may also include a determination of a current location of the information handling system via a location sensor 634. Such a location determination may take the form of Global Positioning Satellite (GPS) coordinates, other geographic locations (e.g., city, state, country), or known user-defined locations (e.g., work, home). Determination of the location may be made based on GPS triangulation, IP address of a connected network, or other geolocation methods using location sensor 634 as known in the art.

The physical surroundings indicators 630 in an embodiment may also include a determination of a time of day for the information handling system. Such a time of day determination may be provided from a processor clock or other internal clock of the information handling system as understood by those of skill in the art. Further, the time of day may be influence by the location determination as described above from location sensor 634 or may be determined and coordinated via a network interface device 636 making a wireless connection for time updates and location.

In an embodiment, the physical surroundings indicators 630 may also include identification of a connected network. For example, the network interface device 636 of the information handling system may transmit an identification of a wired or wireless network with which it has established a connection to the typing profile based mood sensing system 626. Such information may be used to identify the location of the user, or to establish that the user is in transit. For example, if the network interface device 636 establishes a WLAN connection with a stationary access point over a long duration of time, it may be determined that the information handling system is roughly stationary. In contrast, if the network interface device 636 cannot establish a WLAN or WWAN signal, and either relies on a cellular signal to connect to the internet, or does not establish a connection with the internet at all, it may be determined the information handling system is travelling at a relatively high rate of speed (e.g., travelling via plane or car). Indicators that the user is travelling may be associated with detected moods such as high stress, for example.

The physical surroundings indicators 630 in an embodiment may also include sound indicators captured by a microphone 638. A microphone 638 may capture ambient sound surrounding the information handling system, or may capture voice commands spoken aloud by a user in some embodiments. Such a microphone 638 may capture voice commands of the user that may be used to directly determine a user's mood in some embodiments, including user fatigue, user stress, user anger, etc. Ambient sound may indicate whether a user is in a relatively secluded space or in a crowded area surrounded by other people. User's located within densely crowded areas in some embodiments may be associated, for example, with a stressed mood. Indicators 630 transmitted from the microphone 638 in an embodiment may also include indication that the user is engaged in an audio conversation with another person located within the same room, via a phone not included within the information handling system, or via a voice conferencing application running on the information handling system. These are only a few examples of environmental condition indicators that may be monitored and communicated to the typing profile based mood sensing system 626 in an embodiment. Other embodiments contemplate any information received from a sensor device, including Internet of Things (IoT) sensors, thermometers, biometric sensors (e.g., heart rate monitors, blood pressure monitors), or humidity sensors, for example.

The typing profile based mood sensing system 626 in an embodiment may also receive application usage data 640 from one or more applications running on the information handling system. For example, the information handling system in an embodiment may run an entertainment-based application 642 or a hot key software application 644. An entertainment-based software application 642 may be one that users often use when enjoying personal time rather than work. For example, the entertainment-based software application 642 may be a video streaming service or social media application. Usage of such an entertainment-based software application 642 in an embodiment may, for example, be associated with a relaxed mood of the user.

A hot key software application 644 in an embodiment may include applications that employ one or more keys or the touch pad to perform an action within the application, other than typing of the letter represented by the key. For example, a computer game that uses the "F" key to fire a weapon may comprise such a hot key software application 644. In other embodiments, application usage data 640 may include information managed by an application, such as, for example, a user's schedule indicating appointments, tasks, etc. These are only a few examples of application data usage metrics that may be monitored and communicated to the typing profile based mood sensing system 626 in an embodiment. Other embodiments contemplate any usage metrics routinely gathered for purposes of analytics, security assessment, or network/enterprise optimization, for example. In addition, the typing profile based mood sensing system 626 may receive metrics for peripheral devices operably connected to the information handling system and in active use. For example, the application usage metrics may describe whether or how a user is engaging with an operably connected printer, mouse, removable hard drive, head mounted display, controller glove, or other gaming controller. Further, any of the haptic hardware typing or touch behavioral parameters 610, user-defined haptic settings 604, physical surroundings indicators 630, or application usage data 640 may be recorded at a specific information handling system (e.g., the information handling system upon which code instructions of the typing profile based mood sensing system 626 are currently being executed), across a plurality of information handling systems operated by the same user over time, or may be drawn from a plurality of information handling systems operated by a plurality of users in a crowd-sourced information gathering method.

The typing profile based mood sensing system 626 in some embodiments may confirm accuracy of an initial determination of user mood, made based on comparison of the personal typing profile and updated haptic hardware typing or touch behavior parameters, if the mood indicated by the user-defined haptic settings 604, physical surroundings indicators 630, or application usage data 640 match the mood indicated by the changes between the personal typing profile and the updated haptic hardware typing or touch behavior parameters. For example, in an embodiment in which changes between the personal typing profile and the updated haptic hardware typing or touch behavior parameters are associated with a stressed mood, and the received user-defined haptic settings 604, physical surroundings indicators 630, or application usage data 640 are also associated with a stressed mood, the typing profile based mood sensing system may confirm the user is in a stressed mood. In contrast, if the mood indicated by the user-defined haptic settings 604, physical surroundings indicators 630, or application usage data 640 does not match the mood indicated by the changes between the personal typing profile and the updated haptic hardware typing or touch behavior parameters, the typing profile based mood sensing system 626 in some embodiments may determine an initial determination of user mood, made based on comparison of the personal typing profile and updated haptic hardware typing or touch behavior parameters, is incorrect and should not be acted upon. For example, in an embodiment in which changes between the personal typing profile and the updated haptic hardware typing or touch behavior parameters are associated with a relaxed mood, and the received user-defined haptic settings 604, physical surroundings indicators 630, or application usage data 640 are associated with a stressed mood, the typing profile based mood sensing system 626 may ignore the initial determination of the relaxed mood and not take action to adjust the haptic keyboard settings in response thereto.

Combinations of or the shifts in values for the haptic hardware typing or touch behavioral parameters 610 measured by a haptic controller 651 from those in a personal typing profile of a user may correspond to a determination of a mood classification for the user. The typing profile based mood sensing system 626 may access a mood correlation database to determine mood classification as discussed in embodiments herein. The typing profile based mood sensing system 626 may assess shifts in values of one or more haptic hardware typing or touch behavioral parameters 610, as well as other factors such as time of day, physical surrounding indicators 430, or application usage data 440, to align with mood classifications found in the mood correlation database of the typing profile based mood sensing system 626. In particular example embodiments, the typing profile based mood sensing system 626 may input one or more shifts detected for haptic hardware typing or touch behavioral parameters 610 into a machine learning classifier to determine a mood classification that best aligns with the shifts in the combination of haptic hardware typing or touch behavioral parameters 610 in some embodiments. This machine learning classifier may further account for other factors such as time of day, physical surrounding indicators 430, or application usage data 440 in yielding a correlation value for determining a mood classification.

Specific values for certain user-defined haptic settings 604, physical surroundings indicators 630, and application usage data 640 may be associated in memory with preset user mood classifications. For example, a user-defined haptic setting 604 instructing the typing profile based mood sensing system 626 to decrease vibration intensity by a percentage value that meets or exceeds a preset threshold value (e.g., 20%) may be associated in memory with a preset user mood indication of "stressed." As another example, a biometric reading indicating user fatigue, as determined via image processing software may be associated in memory with a preset user mood indication of "fatigued." As yet another example, application usage data 640 indicating the user is currently using an entertainment-based application 642 may be associated in memory with a preset user mood indication of "relaxed." These are only a few examples of user mood classifications, and other user moods are also contemplated.

Once the typing profile based mood sensing system 626 associates a detected change in haptic hardware typing or touch behavior parameters 610 with a known mood classification (and optionally confirms such a mood classification via additional user-defined haptic settings 604, physical surroundings indicators 630 or application usage data 640), the typing profile based mood sensing system 626 may determine a mood classification and suggest or automatically apply changes to one or more of the factors controlling the user's haptic experience of the piezo haptic keyboard assembly or the haptic touchpad. A mood classification may be associated with adjustments to a haptic keyboard or a haptic touchpad function according to embodiments herein or may be associated with adjustments to information handling system operations or software application functions in some example embodiments. Adjustments to an information handling system may include adjustments to display brightness levels, sound levels, error correction measures, software back up initiation, other software interruptions, or similar adjustments. The adjustments to the piezo haptic keyboard or haptic touchpad function or adjustments to information handling system operations or software application function may be assessed via a look up table correlating changes to a determined mood classification in some example embodiments. Each mood classification may be associated in memory of a mood correlation database with a mood based haptic setting adjustments 670 associated with a mood classification in an embodiment. For example, a mood classification for "stressed" may be associated in memory with a mood based haptic setting adjustments 670 that increases tactile feedback by increasing the force required to register a keystroke, or increasing the vibration or haptic feedback movement sharpness. As another example, a mood classification for "stressed" may be associated with a mood based haptic setting adjustments 670 that allows the user to type more quickly, such as decreasing the vibration or haptic feedback movement duration following a keystroke. As another example, a mood classification for "fatigued" may be associated in memory with a mood based haptic setting adjustments 670 that keeps the user more alert, such as an increase in vibration or haptic feedback movement intensity and duration following a keystroke. In other embodiments, mood classification for "fatigued" may be associated in memory with a mood based haptic setting adjustments 670 that keeps the user more alert, such as an increase display brightness or audio volume, such as with audio keystroke feedback or other audio indicators. As yet another example, a mood classification for "relaxed" may be associated in memory with a mood based haptic setting adjustments 670 that decreases the force required to register a keystroke, or decreases the intensity, duration, and sharpness of vibration or haptic feedback movement following a keystroke. In other embodiments mood classification for "relaxed" may be associated in memory with a mood based haptic setting adjustments 670 that invokes a quiet mode, a decrease in audio volume levels of haptic keystroke feedback or for other system indicators or may reduce brightness levels for a display.

Upon determination of the mood based haptic setting adjustments 670 associated with the confirmed mood classification in an embodiment, the typing profile based mood sensing system 626 may transmit the associated mood based haptic setting adjustments 670 to the piezo controller 651 and haptic keyboard and touchpad control system for automatic transition to the new, preset mood based haptic settings 670 to accommodate the determined or confirmed user mood. In other embodiments, the typing profile based mood sensing system 626 may transmit the preset mood based settings to the personal typing profile user interface 602 as a suggested update to the haptic settings 660. In such an embodiment, the personal typing profile user interface 602 may display the suggested update to the haptic settings 660 to the user, and only institute those updates if the user selects, via the interface 602, to do so.

In an embodiment in which the user chooses to apply suggested changes, or in which the typing profile based mood sensing system 626 automatically applies such changes without suggesting them to the user via the personal typing profile user interface 602, the typing profile based mood sensing system 626 may transmit preset mood based haptic settings 670 to the piezo controller 651. The preset mood classification haptic settings 670 may cause the controller 651 to apply a varying haptic feedback control voltage signal to the piezo element 606 or 608 via the contact foil layer, such that the piezo element deflects downward or upward or returns to a neutral position from a deflected position, depending on the haptic settings 670 received at the controller 651. In such a way, the controller 651 applying varying polarity and magnitude of voltages to the traces in the contact foil in an embodiment may control several factors describing the dynamics of the haptic keyboard assembly, in accordance with the received preset mood classification haptic settings 670.

For example, the controller 651 may roughly define the area (e.g., in the center of the key or touch pad, or on the edges of the key or touch pad) in which a user must apply keystrike force to register a keystroke with piezoelectric elements of the haptic keyboard of embodiments herein. In another example embodiment, the controller 651 may set the downward force which may be required to register a keystroke or a click of a touchpad, based on the received haptic settings 670. As another example embodiment, the controller 651 may set the intensity or force with which a key provides haptic feedback following a keystroke or touchpad actuation, based on the received haptic settings 670. For example, the controller 651 may set the cycle of movement, pulsing, and intensity of the piezo element 606 movement by adjusting the amplitude, polarity, pulsing, or waveform of the haptic control signal provided to the piezo electric element 606. The controller 651 in another example may set the duration and sharpness of such a haptic response, based on the received haptic settings 670, by setting the duration of time between detection of the keystroke or touchpad actuation and deflection of the piezo element 606 for an upward or downward movement of a haptic feedback event and return to its neutral position. In still another example, the controller 651 may set hot buttons or controller keys to control the duration of hot key vibration bursts, and the interval between the haptic response movements in such bursts, based on the received haptic settings 670, by setting the number of voltage pulses, and the timing between them that the contact foil applies to the piezo element 606 or the piezo element 608. By identifying a mood change of a user based on determined changes in haptic hardware typing or touch behavior parameters 610, and optionally confirming such mood changes through measurements of user-defined haptic settings 604, physical surroundings indicators 630, and application usage data 640, and suggesting changes based on such determined mood changes, the typing profile based mood sensing system 626 in embodiments described herein may automatically adapt the keyboard dynamics or touchpad dynamics to accommodate a user's mood.

Figure 7:
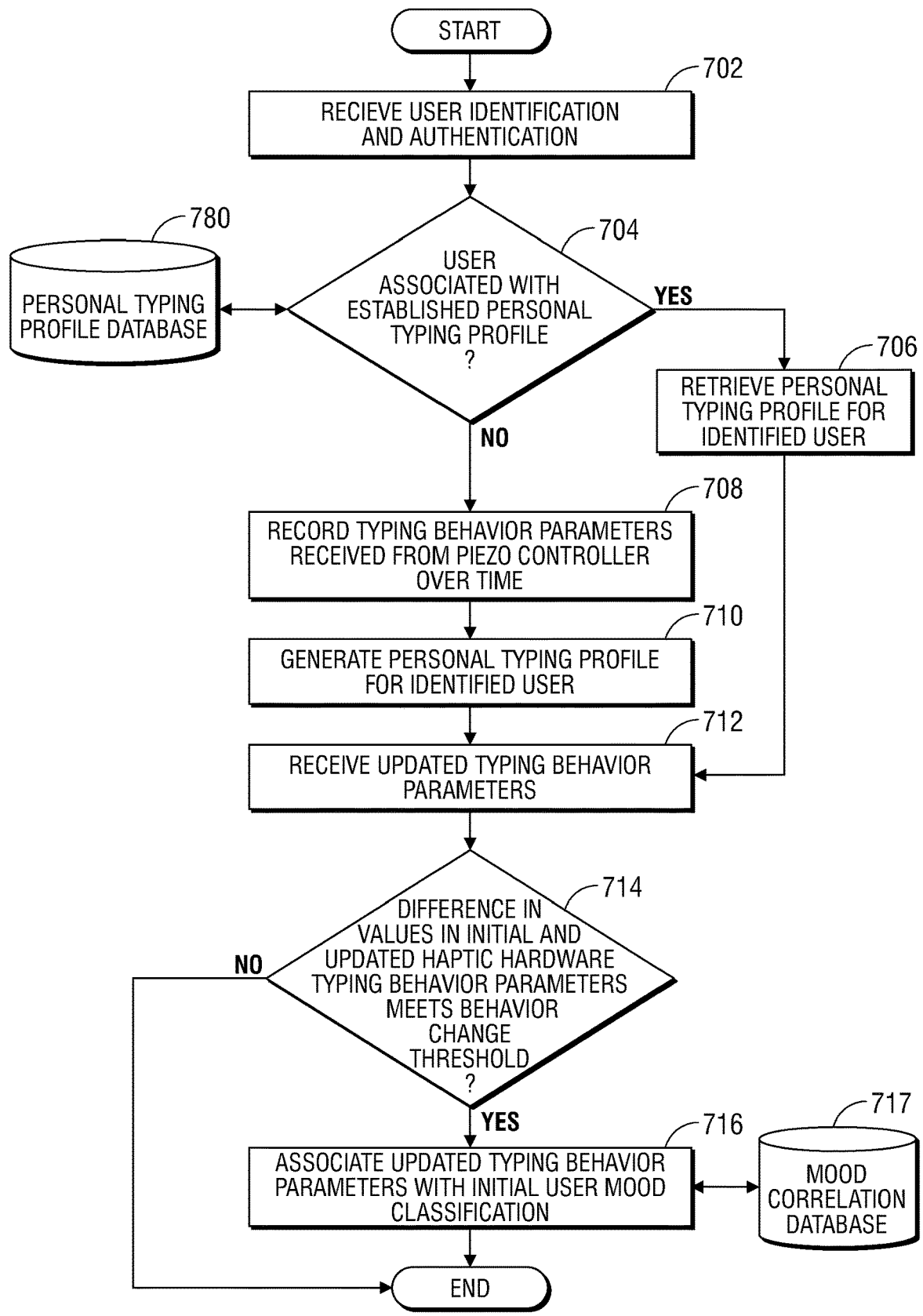
FIG. 7 is a flow diagram illustrating a method of determining an initial user mood classification according to an embodiment of the present disclosure.

FIG. 7 is a flow diagram illustrating a method of determining an initial user mood classification based on detected changes in haptic hardware typing or touch behavior parameters for a known user according to an embodiment of the present disclosure. As described herein, the piezo keyboard controller in embodiments described herein may detect and record various metrics describing the dynamics of the piezo haptic keyboard assembly or a piezo haptic touchpad in use by a specific user over time as a means of identifying a mood of a known user. The combination of specific values (e.g., force, location, and duration of keystrokes, or typing speed) for each of these recorded user haptic hardware typing or touch behavior parameters may change based on a mood of a user.

At block 702, a user identification or authentication may be received. User identification in an embodiment may include, for example, a user providing a username and password to establish that user is authorized to access the information handling system. In other embodiments, other forms of user identification are contemplated. For example, user identification may include biometric identification (e.g., fingerprint scan, retinal scan, facial recognition, voice recognition). In still other embodiments, a user may place a key fob or signal propagating peripheral device within a scanning area surrounding the information handling system, or may engage in a multi-step authentication process (e.g., additionally providing a numeric code transmitted to a known, secure device). Any known method of authentication, either currently in use or developed in the future, that is capable of identifying an individual user or associating an individual user with a known account is contemplated herein.

The typing profile based mood sensing system in an embodiment may determine at block 704 whether the user is associated with an established personal typing profile. As described herein, the typing profile based mood sensing system in an embodiment may use a typing profile machine learning module to identify a pattern of recorded haptic hardware typing or touch behavior parameters for a specific user. Upon identification of such a pattern in an embodiment, the typing profile based mood sensing system may store the output layer node values, representing a personal typing profile for an individual user within the personal typing profile database 780. The typing profile based mood sensing system in an embodiment may access the personal typing profile database 780 to determine whether the user identified at block 702 is associated with a personal typing profile. If the user is not associated with a personal typing profile, the method may proceed to block 708 to begin a training session for creation of a personal typing profile for the user identified at block 702. If the user is associated with a personal typing profile in an embodiment, the method may proceed to block 706 for retrieval of that personal typing profile associated with the identified user.

At block 706, a personal typing profile for an identified user may be received. As described herein, the typing profile based mood sensing system in an embodiment may use a typing profile machine learning module to identify a pattern of recorded haptic hardware typing or touch behavior parameters identified for a specific user while the user is in a calm state. The typing profile based mood sensing system in an embodiment may access the personal typing profile database to access the personal typing profile associated with the identified user upon user login or other authentication. The method may then proceed to block 712 to compare the personal typing profile of the identified user against newly measured haptic hardware typing or touch behavior parameters to detect changes in the mood of the identified user.

In an embodiment in which the identified user is not associated with an established personal typing profile, the typing profile based mood sensing system may initiate a training session, during which it may record a plurality of haptic hardware typing or touch behavior parameters received from the piezo controller over time at block 708. For example, in an embodiment described with respect to FIG. 6, the piezo controller 651 in an embodiment may transmit haptic hardware typing or touch behavior parameters 610 to the typing profile based mood sensing system 626, including metrics describing how a user interacts with the keyboard and touchpad. The piezo controller 651 in an embodiment may monitor changes in voltage magnitude or polarity (e.g., 607 or 609) occurring upon deflection of a plurality of piezo elements (e.g., 606 and 608) in an embodiment, indicating occurrence of keystrokes or clicks of a touch pad. The voltage changes 607 and 609 in embodiments may further indicate the degree to which the piezo elements 606 and 608 deflected, indicating the force with which the user depressed the key or the touchpad situated atop the piezo elements 606 and 608. Additionally, by monitoring such voltage changes (e.g., 607 and 609) for each of the plurality of piezo elements within the piezo element layer in an embodiment, the piezo controller 651 may identify the speed with which the voltage changes occur during an downstroke or upstroke of the keystrike and this may indicate the sharpness with which the keystrokes occur. Further, by monitoring such voltage changes (e.g., 607 and 609) for each of the plurality of piezo elements within the piezo element layer in an embodiment, and aggregating such notifications over time, the piezo controller 651 may identify the locations of keystrokes and clicks for given keys or the touch pad (e.g., roughly within the center of the key or touch pad, or corner strikes), an average duration of keystrokes or touch pad clicks, pauses or intervals in typing, and an overall typing speed. In some embodiments, the piezo controller 651 may detect and log occurrences when a corner strike is detected and immediately followed by the user pressing backspace or delete. In such an embodiment, the piezo controller 651 may also categorize these occurrences as potential mistypes, prompting a need for decreased sensitivity of corner strikes at one or more piezo elements. Changes in one or more of these metrics in an embodiment may indicate a change in users, a change in user mood, or a change in user-desired haptic response. For example, greater force in keystrokes or increased typing speed may indicate a higher level of stress, or may indicate the user would prefer a louder haptic response. These metrics may then be transmitted to the typing profile based mood sensing system 626 as haptic hardware typing or touch behavior parameters 610 in an embodiment.

At block 710, the typing profile based mood sensing system in an embodiment may generate a personal typing profile for the identified user. For example, in an embodiment described with reference to FIG. 6, upon receiving the haptic hardware typing or touch behavior parameters 610, the typing profile based mood sensing system 626 may use a typing profile machine learning module 627 to identify patterns in haptic hardware typing or touch behavior parameters 610, or in a combination of parameters 610. The typing profile machine learning module 627 in an example embodiment may model the relationships between each of the haptic hardware typing or touch behavior parameters 610 using a layered neural network topology, where each layer includes a plurality of nodes representing metric values or states for each of the parameters 610. Users may have repeated patterns of values recorded for one or more haptic hardware typing or touch behavior parameters 610 which may be recognized by the haptic hardware typing or touch behavior parameters 610 as a personal typing profile for a user. An input layer to the neural network, for example, may include a known, recorded set of values for each of these parameters 610, such as those measured at block 708. An output layer to the neural network may include values for a subset of these parameters 610 that are likely to be unique to the individual user when in a baseline mood such as a calm mood. Such an output layer may be adopted as a personal typing profile for the user in some embodiments.

In other aspects of embodiments herein, the typing profile machine learning module 627 in an embodiment may attempt to determine the degree to which each of these parameters 610 can be used to identify an individual user in a baseline mood by assigning preliminary weight matrices to each of the nodes in a given layer. Each assigned weight value in the matrix may describe a likelihood that one of these parameters 610 uniquely describes the behaviors of a specific, known, individual user in a baseline mood. The nodes of each layer in an embodiment may be equivalent to the nodes in the previous layer, multiplied by their respective weight matrices. The neural network may then forward propagate to produce an output layer including a plurality of nodes, each representing a value for a haptic hardware typing or touch behavior parameter 610 that is projected to accurately identify an individual user in a baseline mood. An initial forward propagation in an embodiment may project a pattern of haptic hardware typing or touch behavior parameters 610 values recorded over a short period of time, that the typing profile based mood sensing system identifies as likely to identify an individual user in a baseline mood.

In further aspects of an embodiment for generating a personally typing profile for a user, the typing profile machine learning module 627 in an embodiment may compare the values in the output layer generated in such an initial forward propagation with later-measured haptic hardware typing or touch behavior parameters 610 recorded during the training session described with reference to block 708. In such a way, the typing profile machine learning module 627 may compare the projected pattern of haptic hardware typing or touch behavior parameters 610 unique to the individual user with freshly gathered haptic hardware typing or touch behavior parameters 610 also describing the typing behavior of the same individual user, still in a calm, baseline mood, during the training session. The typing profile machine learning module 627 may then determine a degree of error associated with each projected value (e.g., associated with each node in the output layer of the neural network), then use these known error margins to adjust the weight matrices associated with each layer of the modeled neural network. For example, the typing profile machine learning module 627 may perform a back-propagation method to adjust each of the weight matrices in order to more accurately reflect the likelihood that each of the values of the haptic hardware typing or touch behavior parameters 610 uniquely describes the individual user in a calm, baseline mood. The typing profile machine learning module 627 in an embodiment may perform this forward propagation and backward propagation, using different input node values repeatedly to finely tune the weight matrices during the training session, until the difference between the output layer values in the most recent iteration and the current iteration fall within a preset threshold percentage of one another. The typing profile machine learning module 627 in an embodiment may end the training session, and store the output layer node values, representing values for one or more of the haptic hardware typing or touch behavior parameters 610 for the current iteration in the personal typing profile 680. The stored output layer node values in the personal typing profile 680 may then be associated with the individual user.

The typing profile based mood sensing system in an embodiment may receive updated haptic hardware typing or touch behavior parameters at block 712, once a personal typing profile has been retrieved or created for the identified user. This may begin an ongoing period of continuous mood-sensing, in an embodiment. This period of continuous mood-sensing may occur at any time following termination of the training session time period described with reference to block 708, or following retrieval of a personal typing profile associated with the identified user at block 706. During this period, the typing profile based mood sensing system may receive updated values for each of the haptic hardware typing or touch behavior parameters described with reference to various figures herein.

At block 714, the typing profile based mood sensing system may determine whether a difference in values in initial and updated haptic hardware typing or touch behavior parameters meets a behavior change threshold in an embodiment. For example, in an embodiment described with reference to FIG. 6, the typing profile based mood sensing system 626 may compare values for the haptic hardware typing or touch behavior parameters 610 received at block 712 during the mood-sensing data gathering to values for the same haptic hardware typing or touch behavior parameters 610 given within the identified user's personal typing profile to determine changes in user typing behavior. For example, if one or more of the values for these haptic hardware typing or touch behavior parameters 610 differ markedly or by a magnitude that is greater than a threshold comparison value (e.g., 5%, 20%, 50%, 80%), the typing profile based mood sensing system 626 may determine a change in mood has occurred. As another example, increased force of each keystroke, or overall typing speed, beyond a threshold value may be associated in memory with a stressed mood. In yet another example, increasingly erratic keystroke locations may be associated in memory with a fatigued mood. As yet another example, an increase in duration of keystrokes beyond a threshold value may be associated in memory with a relaxed mood. In other embodiments, the typing profile based mood sensing system 626 may determine a change in a user's mood based on a combination of changes detected among a plurality of haptic hardware typing or touch behavior parameters. For example, a combination of increasingly erratic keystroke locations and a decrease in overall typing speed beyond a threshold value may be associated in memory with fatigue.

Threshold requirements in some embodiments may apply to only one of the haptic hardware typing or touch behavior parameters (e.g., typing speed). In other embodiments, threshold requirements may apply to a combination of haptic hardware typing or touch behavior parameters (e.g., duration and location of keystrokes). In still other embodiments, specific combinations of threshold requirements may be required for each of a combination of haptic hardware typing or touch behavior parameters (e.g., 20% increase in typing speed, and 10% increase in force of keystrokes). If the typing profile based mood sensing system determines the difference in values does not meet a behavior change threshold, this may indicate the user's mood has not changed from the calm mood in which she underwent the training session. This may further indicate that no change in haptic keyboard settings is currently required, and the method may then end.

In other embodiments, the typing profile based mood sensing system may input updated haptic hardware typing or touch parameters measured during mood-sensing data gathering at block 712 into a machine learning classifier to identify if any mood classifications apply to the updated haptic hardware typing or touch parameters. The machine learning classifier may utilize the updated haptic hardware typing or touch parameters as well as previous haptic hardware typing or touch parameters of a user's personal typing profile for a baseline mood to correlate any detected differences and plurality of changed parameters with a mood category in some embodiments. In particular embodiments, the machine learning classifier may determine a classification correlation value for one or more mood classifications and the typing profile based mood sensing system may determine if the correlation probability is sufficient or may select the most probable correlated mood category or determine that no mood shift has occurred. If the typing profile based mood sensing system determines the difference in values meets a behavior change threshold or falls into a mood classification likelihood, the method may proceed to block 716 for determination of an initial user mood classification based on the detected behavior change. If the typing profile based mood sensing system determines the difference in values do not meet a behavior change threshold or does not fall into a mood classification likelihood, the method may end The typing profile based mood sensing system may determine an initial user mood classification based on the detected mood change in an embodiment at block 716. Specific values for determined changes in values for one or more haptic hardware typing or touch behavior parameters may be associated in memory with preset user mood classifications. For example, increased force of each keystroke, or overall typing speed, beyond a threshold value may be associated in memory with a stressed mood. As another example, increasingly erratic keystroke locations may be associated in memory with a fatigued mood. As yet another example, an increase in duration of keystrokes beyond a threshold value may be associated in memory with a relaxed mood. In other embodiments, the typing profile based mood sensing system may determine a change in a user's mood based on a combination of changes detected among a plurality of haptic hardware typing or touch behavior parameters. For example, a combination of increasingly erratic keystroke locations and a decrease in overall typing speed beyond a threshold value may be associated in memory with fatigue. These are only a few examples of user mood classifications, and other user moods are also contemplated. A variety of mood classifications correlated with one or more combinations of haptic hardware typing or touch behavior parameters and shifts in values therein may be accessed by the typing profile based mood sensing system in a mood correlation database 717 in some embodiments. Further, correlation of mood classifications with one or more mood-based haptic keyboard setting adjustments or touchpad setting adjustments may similarly be determined via access to the mood correlation database 717. Once an initial determination of a user's change in mood is determined, based on changes in the user's typing behavior, the method may end.

Figure 8:
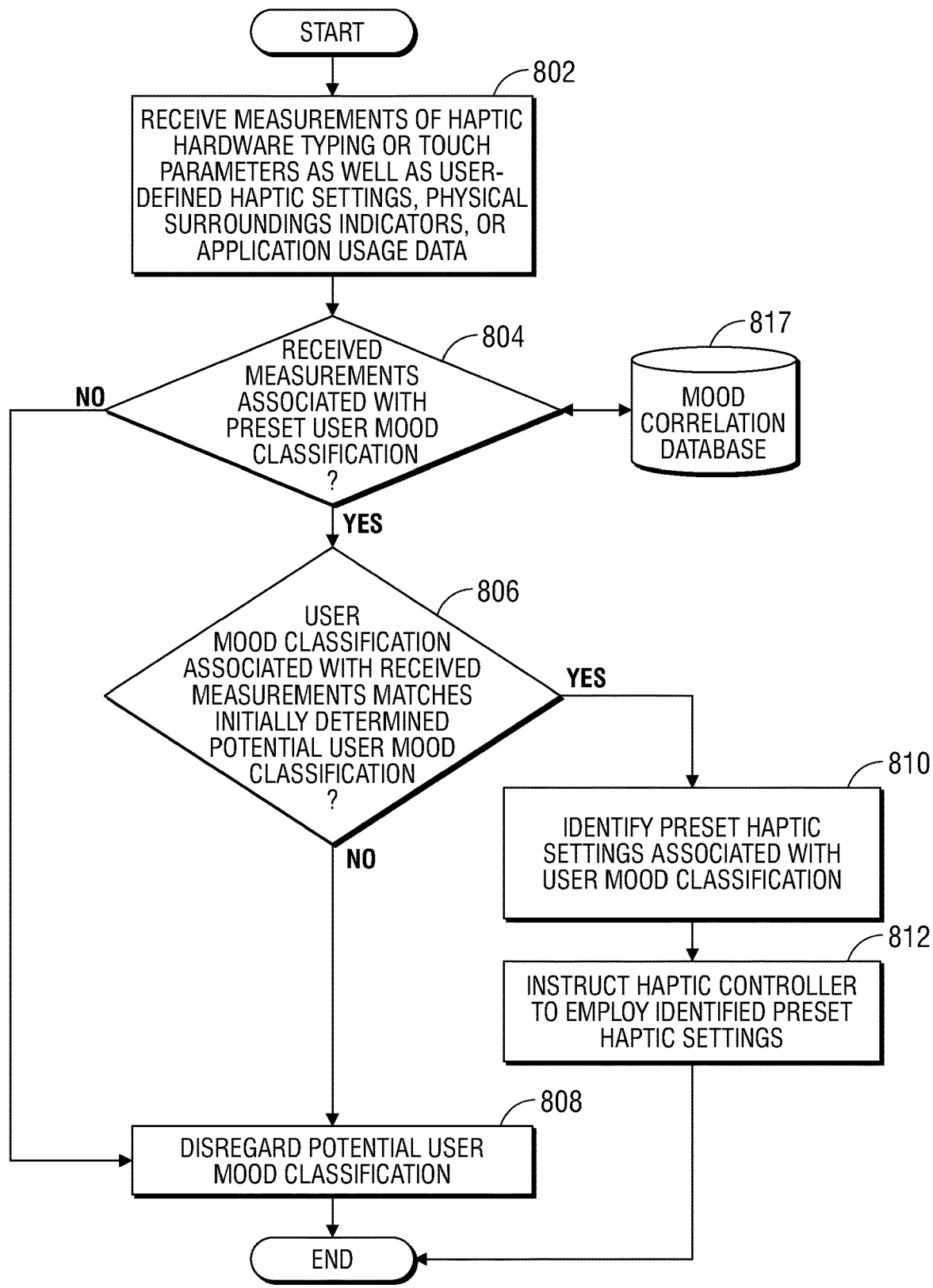
FIG. 8 is a flow diagram illustrating a method of verifying an initial determination of a user's change in mood according to an embodiment of the present disclosure.

FIG. 8 is a flow diagram illustrating a method of determining through measured values of haptic hardware typing or touch behavior parameters as well as user-defined haptic settings, physical surroundings indicators, and application usage data, a determination of a user's change in mood made based on measured changes in user typing behavior at a current time compared to a user's personal typing behavior profile according to an embodiment of the present disclosure. As described herein, by confirming a mood change of a user associated with changes in haptic hardware typing or touch behavior parameter values with additional measurements or detection of user-defined haptic settings, physical surroundings indicators, or application usage data, the typing profile based mood sensing system in an embodiment may automatically adapt the keyboard dynamics or other functions of an information handling system or operating software applications to accommodate a user's mood.

At block 802, the typing profile based mood sensing system in an embodiment may record haptic hardware typing or touch behavior parameter values during a mood sensing data gathering period as well as physical surroundings indicators, user-defined haptic settings, or application usage data over a period of time. For example, in an embodiment described with reference to FIG. 6, the typing profile based mood sensing system 626 may receive physical surroundings indicators 630 from one or more environmental sensors. Time of day may be determined from a system clock and location sensor 634 to determine the time of day and whether a user is at work during the day for example or at home in the evening in some example embodiments. Location and time of day may be indicators that suggest potential moods such as stressed, fatigued, relaxed or the like depending on the physical surrounding circumstances detected. Images captured by the camera 632 in an embodiment, for example, may describe a user's ambient surroundings, such as whether the user is in a crowded or secluded environment, whether the user is working in a darkened room or outside during the day, or whether the user's biometric measurements indicate the user is stressed, fatigued, or relaxed, for example. As another example, location data as measured by a location sensor 634 may be included within the physical surroundings indicators 630. As yet another example, the network interface device 636 of the information handling system may transmit an identification of a wired or wireless network with which it has established a connection. Such information may be used to identify the location of the user, or to establish that the user is in transit. In still another example, a microphone 638 may capture ambient sound surrounding the information handling system, or may capture voice commands spoken aloud by a user in some embodiments.

The typing profile based mood sensing system 626 in an embodiment may also receive application usage data 640 from one or more applications (e.g., a sound sensitive software application 642 or a hot key software application 644) running on the information handling system. A hot key software application 644 in an embodiment may include applications that employ one or more keys or the touch pad to perform an action within the application, other than typing of the letter represented by the key. The user's typing behaviors may vary based on the application in usage at a given time. For example, a user may type more aggressively (e.g., with greater force) when playing a computer game than when drafting a document in a word processing application, or when using an entertainment based application 642.

The typing profile based mood sensing system 626 in an embodiment may also receive user-defined haptic settings 604 which may be part of a stored personal typing profile user interface. A user may adjust several factors governing dynamics of the piezo haptic keyboard assembly, including, for example, the force threshold required for the controller to register that a keystroke has occurred, and the size of the area in which the user must apply such a force in order for the controller to register a keystroke. As another example, a user may adjust the intensity, duration, and sharpness at which a piezo element moves between an upward warped position, downward position, or neutral position following registering a keystroke, and the burst count and interval of sustained movements occurring in response to use of specific applications. As the user adjusts one or more of these settings in an embodiment, the personal typing profile user interface 602 may transmit these user-defined haptic settings 604 to the typing profile based mood sensing system 626 to indicate a user's preferences at a given time.

The typing profile based mood sensing system in an embodiment may determine at block 804 whether the received measurements of haptic hardware typing or touch behavior parameters as well as one or more of the user-defined haptic settings, physical surroundings indicators, or application usage data are associated with a preset user mood classification. The typing profile based mood sensing system may determine if threshold shifts to the currently measured haptic hardware typing or touch behavior parameters have occurred relative to baseline values of a personal typing profile for a calm state. The typing profile based mood sensing system may access a personal typing profile database as described in embodiments herein to obtain the personal typing profile of a user for comparison. Then, upon determining changes in haptic hardware typing or touch behavior parameter values, the personal typing profile based mood sensing system may access a mood correlation database 817 in some embodiments to assess which combination of changes in haptic hardware typing or touch behavior parameter values or changes by what amount may indicate a mood classification. Specific values for certain user-defined haptic settings, physical surroundings indicators, and application usage data may be associated in memory with preset user mood classifications. For example, in an embodiment described with reference to FIG. 6, a user-defined haptic setting 604 instructing the typing profile based mood sensing system 626 to decrease vibration intensity by a percentage value that meets or exceeds a preset threshold value (e.g., 20%) may be associated in memory with a preset user mood indication of "stressed." As another example, a biometric reading 630 indicating user fatigue, as determined via image processing software may be associated in memory with a preset user mood indication of "fatigued." As yet another example, application usage data 640 indicating the user is currently using an entertainment-based application 642 may be associated in memory with a preset user mood indication of "relaxed." In other embodiments, the typing profile based mood sensing system may utilize the currently measured values for haptic hardware typing and touch behavior parameters and baseline values of a personal typing behavior profile into a machine learning classifier for comparison and correlation to one or more mood classifications as described in embodiments herein.

In other aspects, changes to user-defined haptic settings may be recorded. These changes in user-defined haptic settings may relate to determination of which baseline among a plurality of baseline sets of values for haptic hardware typing or touch behavior parameters from a personal typing behavior profile apply to the current conditions. In other embodiments, the user modification to user-defined haptic settings may itself be incorporated as a factor into the determination of mood classifications by the typing profile based mood sensing system according to various embodiments herein. For example, in an embodiment described with reference to FIG. 6, changes in values of user-defined haptic settings 604, such as the user choosing to increase the burst count, vibration intensity, duration, or sharpness, may indicate the user is in a depressed or fatigued state and wishes to increase the tactile response of the keyboard to keep her more alert. As another example, if the user chooses to decrease the downward force required to register a keystroke (force threshold), this may indicate the user is stressed and wishes to type quicker, with less effort. As yet another example, if the user chooses to decrease the detection area for one or more keys, this may indicate the user is fatigued, and typing with less accuracy than normal.

In other aspects, physical surroundings indicators may be recorded. These physical surroundings indicators may relate to determination of which baseline among a plurality of baseline sets of values for haptic hardware typing or touch behavior parameters from a personal typing behavior profile apply to the current conditions. In other embodiments, the physical surroundings indicators may themselves be incorporated as one or more factors into the determination of mood classifications by the typing profile based mood sensing system according to various embodiments herein. For example, a user's biometric measurements or camera-based physical surroundings indicators 630 in some embodiments may indicate the user is stressed, fatigued, or relaxed, for example. Other physical surroundings indicators 630 that the user is travelling may be associated with detected moods such as high stress, for example. Microphone based physical surroundings indicators 630 may capture voice commands of the user that may be used to directly determine a user's mood in some embodiments, including user fatigue, user stress, user anger, etc. Ambient sound may indicate whether a user is in a relatively secluded space or in a crowded area surrounded by other people. User's located within densely crowded areas in some embodiments may be associated, for example, with a stressed mood.

In yet other aspects, application usage data may be recorded. The application usage data for which applications may be operating may relate to determination of which baseline among a plurality of baseline sets of values for haptic hardware typing or touch behavior parameters from a personal typing behavior profile apply to the current conditions. In other embodiments, the application usage data may be incorporated as one or more factors into the determination of mood classifications by the typing profile based mood sensing system according to various embodiments herein. For example, usage of entertainment-based software application 642 in an embodiment may, for example, be associated with a relaxed mood of the user. In another embodiment, usage of a specific hot-key application like a video game may be associated with a stressed mood. As yet another example embodiment, usage of a hot-key application such as excel or word may also be associated with a stressed mood.

At block 806 in one optional embodiment, the typing profile based mood sensing system in an embodiment may confirm whether a determined user mood classification associated with the received currently measured values for the haptic hardware typing or touch behavior parameters match or still relate to the determined user mood classification. In further embodiments, user-defined haptic settings, physical surroundings indicators, or application usage data may be further used or assessed for changes to confirm matching of the initial determination of the user's mood classification.

In an example embodiment in which changes between the personal typing profile and the updated haptic hardware typing or touch behavior parameters are associated with a stressed mood, and the received user-defined haptic settings 604, physical surroundings indicators 630, or application usage data 640 are also associated with a stressed mood, the typing profile based mood sensing system may confirm the user is in a stressed mood. In contrast, if the mood indicated by the user-defined haptic settings 604, physical surroundings indicators 630, or application usage data 640 does not match the mood indicated by the changes between the personal typing profile and the updated haptic hardware typing or touch behavior parameters, the typing profile based mood sensing system 626 in some embodiments may determine an initial determination of user mood, made based on comparison of the personal typing profile and updated haptic hardware typing or touch behavior parameters, is incorrect and should not be acted upon. If the typing profile based mood sensing system determines the mood classification associated with a change in user behavior does not match the mood classification associated with a user-defined haptic setting, physical surroundings indicator, or application usage data, the method may proceed to block 808. If the typing profile based mood sensing system determines the mood classification associated with a change in user behavior matches the mood classification associated with a user-defined haptic setting, physical surroundings indicator, or application usage data, the method may proceed to block 810.

The typing profile based mood sensing system may disregard the initial mood classification associated with the change in user haptic hardware typing or touch behavior parameter values at block 808 in an embodiment in which the initial mood classification does not match a mood classification associated with a received user-defined haptic setting, physical surroundings indicator, or application usage data. For example, in an embodiment in which changes between the personal typing profile and the updated haptic hardware typing or touch behavior parameters are associated with a relaxed mood, and the received user-defined haptic settings 604, physical surroundings indicators 630, or application usage data 640 are associated with a stressed mood, the typing profile based mood sensing system may ignore the initial determination of the relaxed mood and not take action to adjust the haptic keyboard settings in response thereto. The method may then end.

At block 810, the typing profile based mood sensing system in an embodiment in which the mood classification associated with the change in haptic hardware typing or touch behavior parameter values is determined or confirmed may then identify a preset haptic setting associated with the user mood classification. Once the typing profile based mood sensing system 626 associates a detected change in haptic hardware typing or touch behavior parameters 610 associated with a known mood classification (and optionally confirms such a mood classification such as described above in optional embodiment of 806), the typing profile based mood sensing system 626 may suggest or automatically apply changes to one or more of the factors controlling the user's haptic experience of the piezo haptic keyboard assembly, the haptic touchpad, or changes to functions of the information handling system or operating software applications in various embodiments. Each mood classification may be associated in memory with a mood based haptic setting adjustments 670 in an embodiment. For example, a mood classification for "stressed" may be associated in memory with a mood based haptic setting adjustments 670 that increases tactile feedback by increasing the force required to register a keystroke or touch actuation, or increasing the vibration or haptic movement sharpness. As another example, a mood classification for "stressed" may be associated with a mood based haptic setting adjustments 670 that allows the user to type more quickly, such as decreasing the vibration or haptic movement duration following a keystroke or a touchpad actuation. As another example, a mood classification for "fatigued" may be associated in memory with a mood based haptic setting adjustments 670 that keeps the user more alert, such as an increase in vibration or haptic movement intensity and duration following a keystroke or touchpad actuation. As yet another example, a mood classification for "relaxed" may be associated in memory with a mood based haptic setting adjustments 670 that decreases the force required to register a keystroke or touch actuation, or decreases the intensity, duration, and sharpness of vibration or haptic movement following a keystroke or touch. It is understood that the haptic movement may be generated by an active haptic control feedback signal to one or more piezoelectric elements which may generate haptic movement for a haptic feedback event.

The typing profile based mood sensing system in an embodiment may instruct the haptic controller to employ the identified preset haptic settings at block 812 as mood-based haptic keyboard setting adjustments or touchpad setting adjustments. For example, in an embodiment described with reference to FIG. 6, upon determination of the mood based haptic setting adjustments 670 associated with the confirmed mood classification in an embodiment, the typing profile based mood sensing system 626 may transmit the associated mood based haptic setting adjustments 670 to the piezo controller 651 for automatic transition to the new, preset mood based haptic settings 670 to accommodate the determined or confirmed user mood. The typing profile based mood sensing system 626 may transmit preset mood based haptic settings 670 to the piezo controller 651, which may cause the controller 651 to apply a varying haptic feedback control voltage signal to the piezo element 606 or 608 via the contact foil layer, such that the piezo element deflects downward or upward or returns to a neutral position from a deflected position, depending on the haptic settings 670 received at the controller 651. In such a way, the controller 651 applying varying polarity and magnitude of voltages to the traces in the contact foil in an embodiment may control several factors describing the dynamics of the haptic keyboard assembly, in accordance with the received preset mood classification haptic settings 670.

For example, the controller 651 may roughly define the area (e.g., in the center of the key or touch pad, or on the edges of the key or touch pad) in which a user must apply keystrike force to register a keystroke with piezoelectric elements of the haptic keyboard of embodiments herein. In another example embodiment, the controller 651 may set the downward force which may be required to register a keystroke or a click of a touchpad, based on the received haptic settings 670. As another example embodiment, the controller 651 may set the intensity or force with which a key provides haptic feedback following a keystroke, based on the received haptic settings 670. For example, the controller 651 may set the cycle of movement, pulsing, and intensity of the piezo element 606 movement by adjusting the amplitude, polarity, pulsing, or waveform of the haptic control signal provided to the piezo electric element 606. The controller 651 in another example may set the duration and sharpness of such a haptic response, based on the received haptic settings 670, by setting the duration of time between detection of the keystroke and deflection of the piezo element 606 an upward or downward movement of a haptic feedback event and return to its neutral position. In still another example, the controller 651 may set hot buttons or controller keys to control the duration of hot key vibration bursts, and the interval between the haptic response movements in such bursts, based on the received haptic settings 670, by setting the number of voltage pulses, and the timing between them that the contact foil applies to the piezo element 606 or the piezo element 608. By identifying a mood change of a user based on determined changes in haptic hardware typing or touch behavior parameters, and optionally confirming such mood changes through measurements of user-defined haptic settings, physical surroundings indicators, and application usage data, and suggesting changes based on such determined mood changes, the typing profile based mood sensing system in embodiments described herein may automatically adapt the keyboard dynamics or touchpad dynamics to accommodate a user's mood.

The blocks of the flow diagrams of FIGS. 7-8 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A typing profile based mood sensing system of an information handling system comprising:
   a processor receiving a user identification associated with a personal typing profile identifying a repeated pattern of an initial set of values for a combination of a plurality of previously recorded haptic hardware typing or touch behavior parameters;
   a piezo haptic keyboard controller operably connected to a plurality of piezo electric elements situated beneath a plurality of keys of the piezo keyboard detecting actuation signals from keystrokes of a key and providing a haptic feedback control signal to the piezoelectric element of the key;
   piezo haptic keyboard controller measuring current haptic hardware typing or touch behavior parameters describing characteristics of a plurality of deformations of the plurality of piezo electric elements during a mood-sensing phase;
   the processor comparing the user personal typing behavior profile against the currently measured haptic hardware typing or touch behavior parameters to identify a user personal typing behavior profile value change;
   the processor associating the user personal typing behavior profile value change with a mood-based haptic keyboard setting adjustment; and
   the piezo haptic keyboard controller to adjust the control of the piezo electric element operation according to the mood-based haptic keyboard setting adjustment.

2. The typing profile based mood sensing system of claim 1, wherein the processor correlates the user personal typing behavior profile value change with a mood classification that determines the mood-based haptic keyboard setting adjustment.

3. The typing profile based mood sensing system of claim 1, wherein the mood-based haptic keyboard setting adjustment modifies the haptic feedback control signal to a contact foil layer operably connecting the piezo haptic keyboard controller to one of the plurality of piezo electric elements to cause the one of the plurality of the piezo electric elements to operate according to the mood-based haptic keyboard setting adjustment.

4. The typing profile based mood sensing system of claim 1 further comprising:
   the processor receiving one or more physical surrounding indicator values via an operably connected environmental sensor; and
   the processor further associating one of the physical surrounding indicator values with the mood-based haptic keyboard setting adjustment.

5. The typing profile based mood sensing system of claim 1, wherein the mood-based haptic keyboard setting adjustment increases or decreases a downward force that must be applied to the piezo electric elements to register a keystroke.

6. The typing profile based mood sensing system of claim 1, wherein the mood-based haptic keyboard setting adjustment increases or decreases a duration, intensity, or sharpness of haptic feedback movement of the piezo electric elements following occurrence of a keystroke.

7. The typing profile based mood sensing system of claim 1, wherein the current haptic hardware typing or touch behavior parameters include a force used to depress one or more piezo electric elements and register a keystroke.

8. A method for mood identification based on piezo haptic keyboard typing dynamics comprising:
   receiving a user identification, via a processor, associated with a personal typing profile identifying a combination of a plurality of previously recorded haptic hardware typing or touch behavior parameters associated with a user;
   detecting actuation signals from keystrokes of a key via a piezo haptic keyboard controller and providing a haptic feedback control signal to the piezoelectric element of the key;
   measuring current haptic hardware typing or touch behavior parameters describing characteristics of a plurality of deformations of a plurality of piezo electric elements during a mood sensing phase via the piezo haptic keyboard controller operably connected to the plurality of piezo electric elements situated beneath a plurality of keys of a piezo keyboard;
   comparing, via the processor, the user personal typing behavior profile against the currently measured haptic hardware typing or touch behavior parameters to identify a user personal typing behavior profile value change;
   associating the user personal typing behavior profile value change with a mood classification having a mood-based haptic keyboard setting adjustment; and
   applying the mood-based haptic keyboard setting adjustment to the haptic feedback control signal to a contact foil layer operably connecting the piezo haptic keyboard controller to one of a plurality of piezo electric elements to cause adjustment to one of the plurality of the piezo electric elements.

9. The method of claim 8 further comprising:
   receiving one or more physical surrounding indicator values via an operably connected environmental sensor; and
   further associating one of the physical surrounding indicator values with the mood-based haptic keyboard setting adjustment.

10. The method of claim 8 further comprising:
    associating the user personal typing behavior profile value change with the mood classification of a stressed state, via the processor.

11. The method of claim 8 further comprising:
    associating the user personal typing behavior profile value change with the mood classification of a fatigued state, via the processor.

12. The method of claim 8 further comprising:
    associating the user personal typing behavior profile value change with the mood classification of a relaxed state, via the processor.

13. The method of claim 8, wherein the currently measured haptic hardware typing or touch behavior parameters include a duration of a keystroke.

14. The method of claim 8, wherein the currently measured haptic hardware typing or touch behavior parameters include a location of a keystroke on a key.

15. A typing profile based mood sensing system of an information handling system comprising:
- a processor receiving a user identification associated with a personal typing profile identifying a repeated pattern of values for a combination of a plurality of previously recorded haptic hardware typing or touch behavior parameters;
- a piezo electric element controller operably connected to a plurality of piezo electric elements situated beneath a plurality of keys of the piezo keyboard or piezo touchpad for detecting actuation signals and returning haptic feedback control signals;
- the piezo electric element controller measuring current haptic hardware typing or touch behavior parameters describing actuation characteristics of the plurality of piezo electric elements;
- the processor comparing the user personal typing behavior profile against the current haptic hardware typing or touch behavior parameters to identify a user personal typing behavior profile value change;
- the processor associating the user personal typing behavior profile value change with a mood-based haptic keyboard setting adjustment; and
- the piezo electric element controller to adjust the control of the piezo electric element operation of the haptic keyboard or haptic touchpad according to the mood-based haptic keyboard setting adjustment, where the adjustment includes applying an electrical current level to a contact foil layer operably connecting the piezo haptic keyboard controller to one of the plurality of piezo electric elements to cause the one of the plurality of the piezo electric elements to operate according to the preset, mood-based haptic keyboard setting adjustment.

16. The typing profile based mood sensing system of claim 15, wherein the processor correlates the user personal typing behavior profile value change with a mood classification that determines the mood-based haptic keyboard setting adjustment.

17. The typing profile based mood sensing system of claim 16, wherein a physical surroundings indicator is a biometric reading indicating a mood classification of user fatigue.

18. The typing profile based mood sensing system of claim 15, wherein the mood-based haptic keyboard setting adjustment modifies the haptic feedback control signal to a contact foil layer operably connecting the piezo electric element controller to one of the plurality of piezo electric elements to cause the one of the plurality of the piezo electric elements to operate according to the mood-based haptic keyboard setting adjustment.

19. The typing profile based mood sensing system of claim 15, wherein the current haptic hardware typing or touch behavior parameters include a typing speed.

20. The typing profile based mood sensing system of claim 15, wherein an application usage data metric indicates an entertainment-based application is in use further associates the user personal typing behavior profile value change with a mood-based haptic keyboard setting adjustment.

* * * * *